Figure 1:
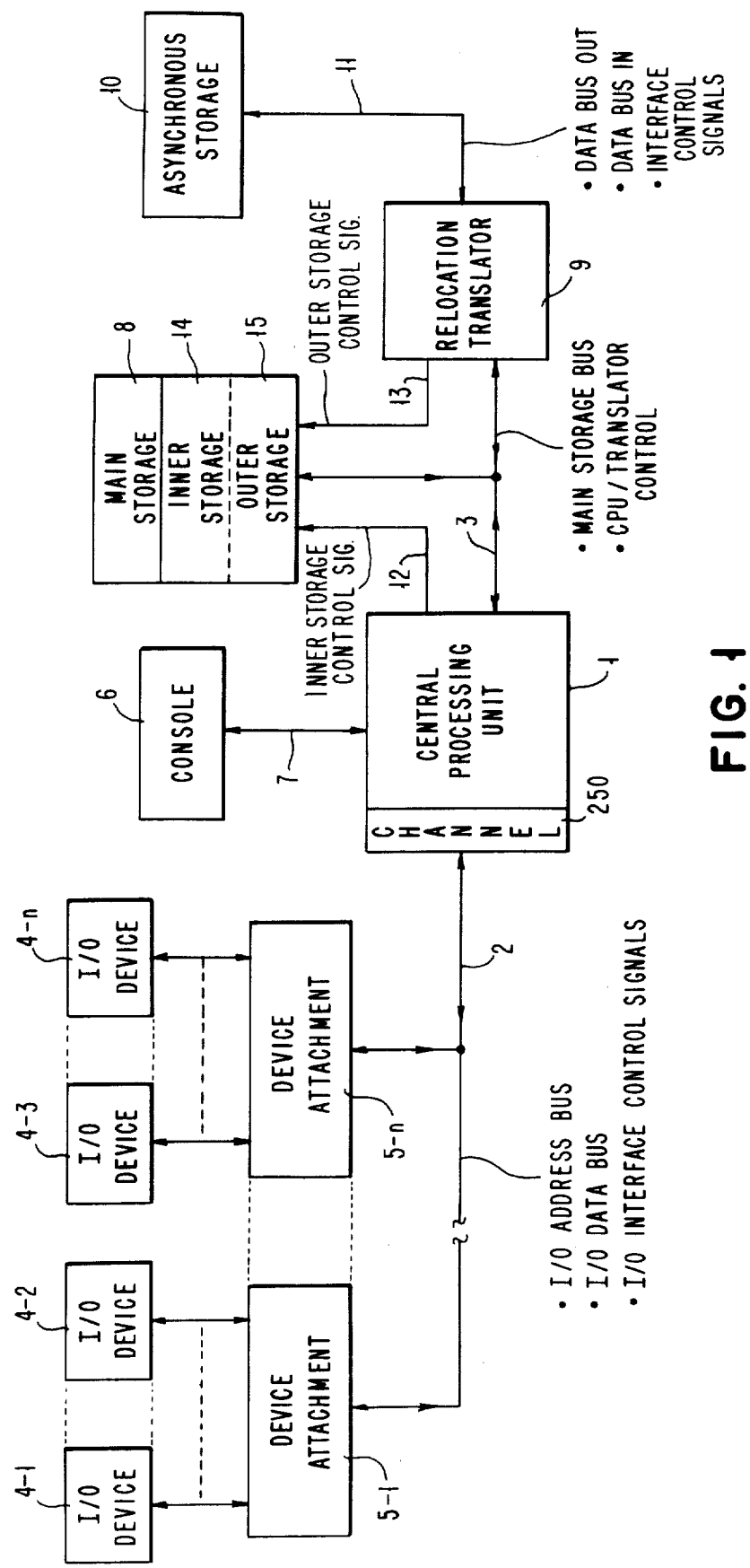

United States Patent [19]

Davis et al.

[11] 4,041,462

[45] Aug. 9, 1977

[54] DATA PROCESSING SYSTEM FEATURING SUBROUTINE LINKAGE OPERATIONS USING HARDWARE CONTROLLED STACKS

[75] Inventors: Michael Ian Davis; Gary Wayne Mayes; Thomas Stephen McDermott; Larry Edward Wise, all of Boca Raton, Fla.

[73] Assignee: International Business Machines Corporation, Armonk, N.Y.

[21] Appl. No.: 682,002

[22] Filed: Apr. 30, 1976

[51] Int. Cl.² .............................................. G06F 9/18
[52] U.S. Cl. .................................................. 364/200
[58] Field of Search ........................... 340/172.5; 445/1

[56] References Cited

U.S. PATENT DOCUMENTS

| 3,548,384 | 12/1970 | Barton et al. | 340/172.5 |
| 3,639,912 | 1/1972 | Campbell | 340/172.5 |
| 3,771,146 | 11/1973 | Cotton et al. | 340/172.5 |
| 3,868,644 | 2/1975 | Healey et al. | 340/172.5 |
| 3,909,797 | 9/1975 | Gross et al. | 340/172.5 |

Primary Examiner—Harvey E. Springborn
Attorney, Agent, or Firm—D. Kendall Copper

[57] ABSTRACT

A data processing system is described wherein, during linkage to a subroutine, by a single machine instruction, a complete status save and the assignment of a dynamic work area are effected. By another single machine instruction the process is reversed. The elements of the complete machine status and the dynamic work area are retained in a hardware controlled stack, thus permitting nesting of the subroutine calls.

7 Claims, 10 Drawing Figures

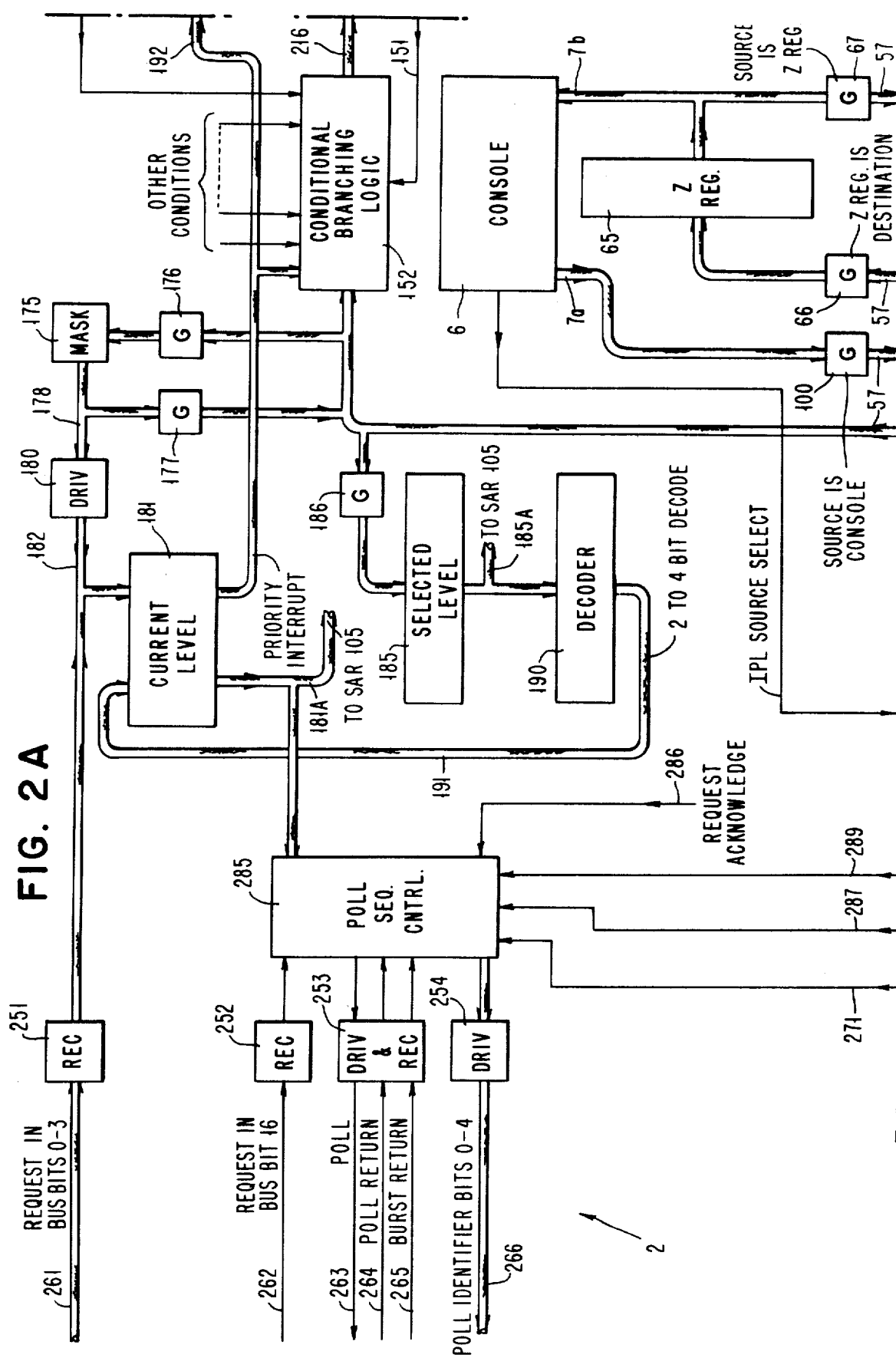

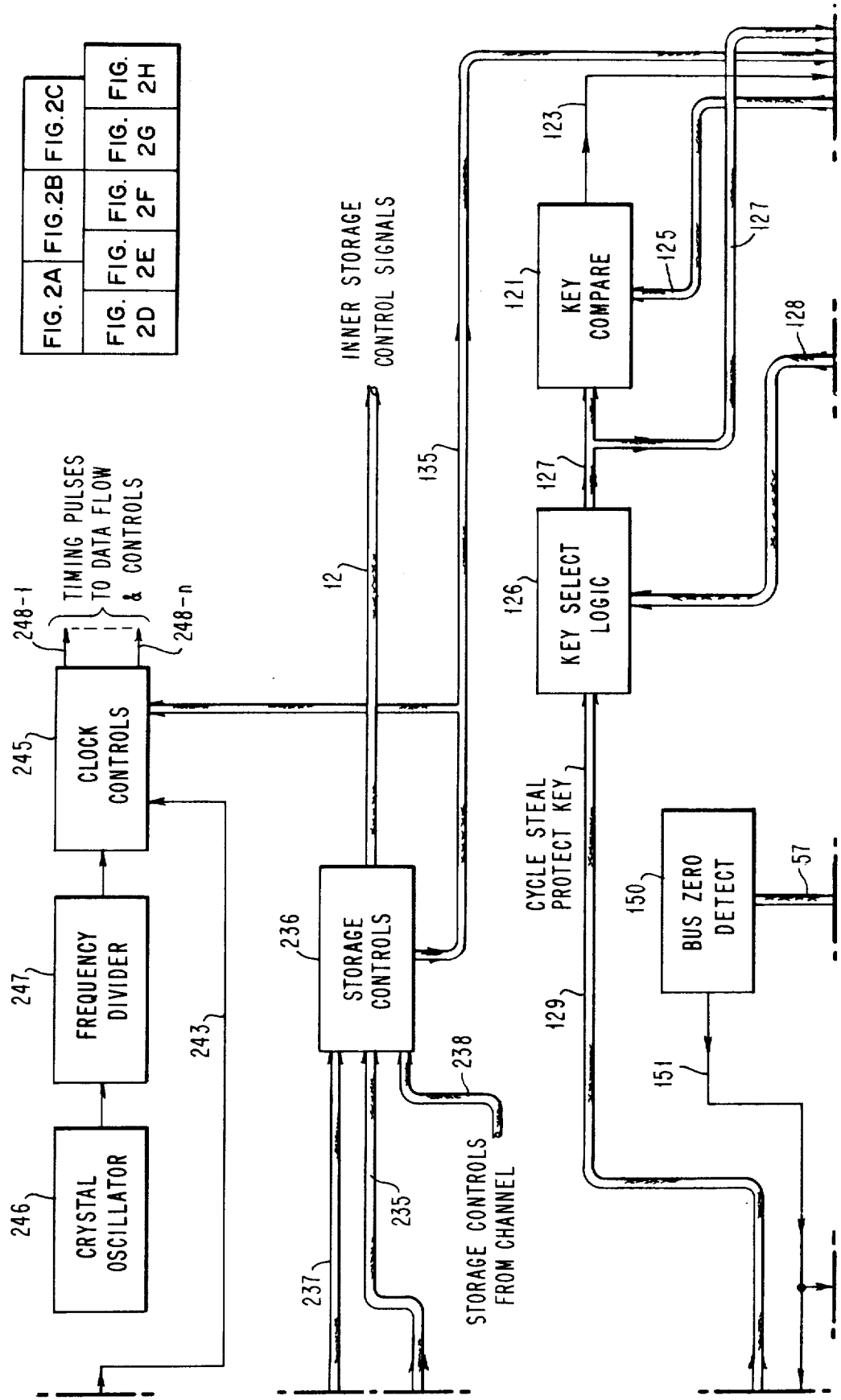

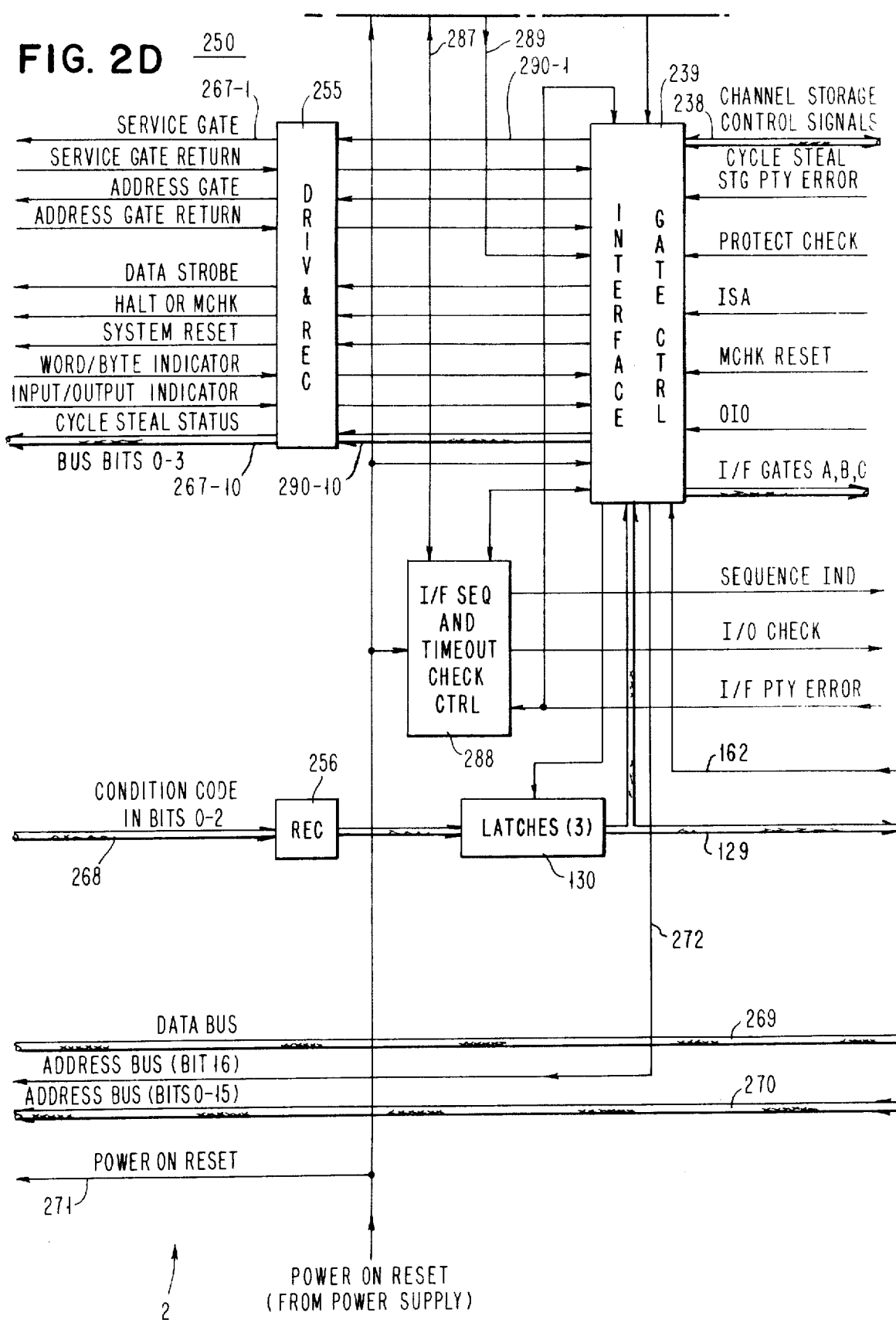

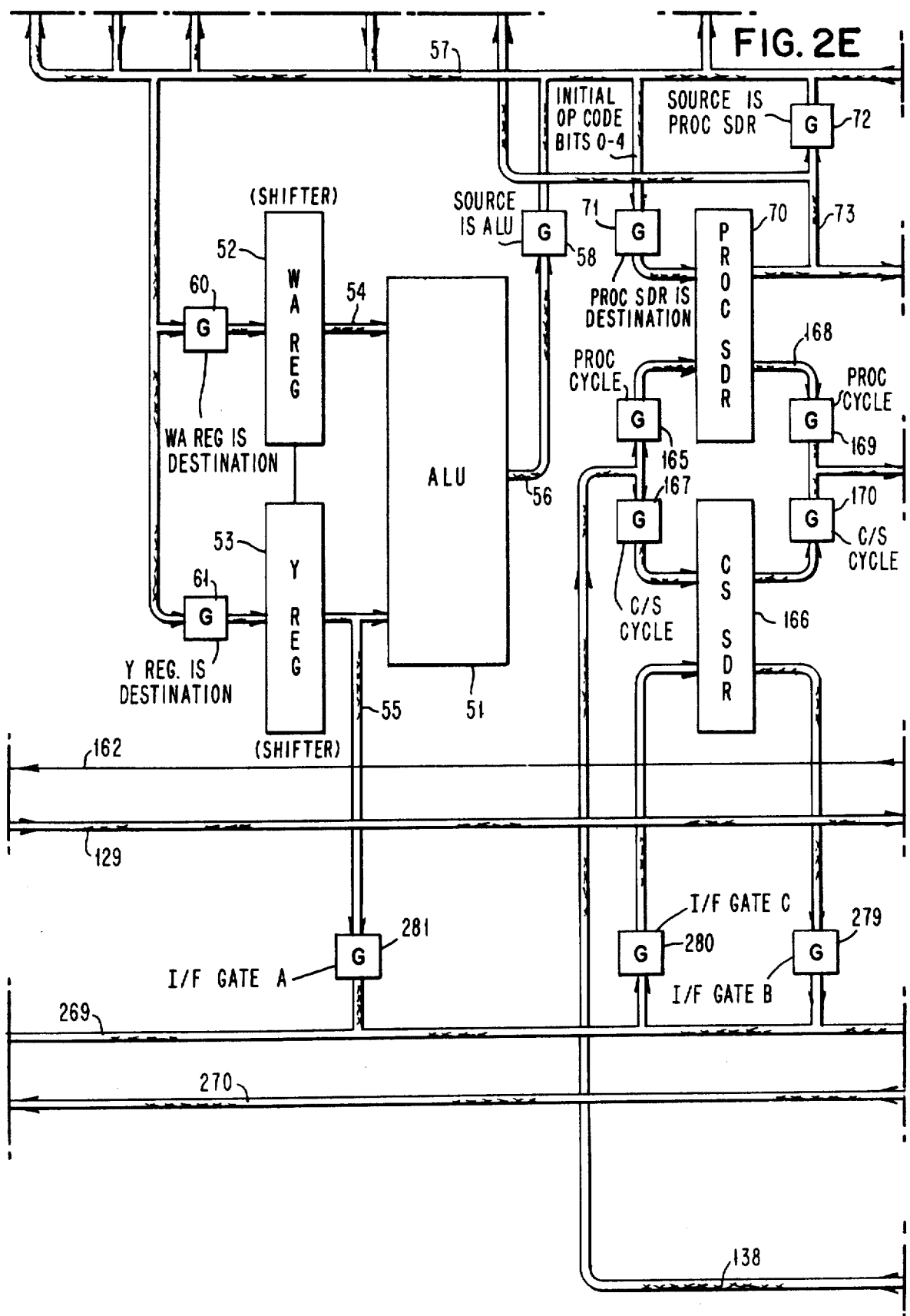

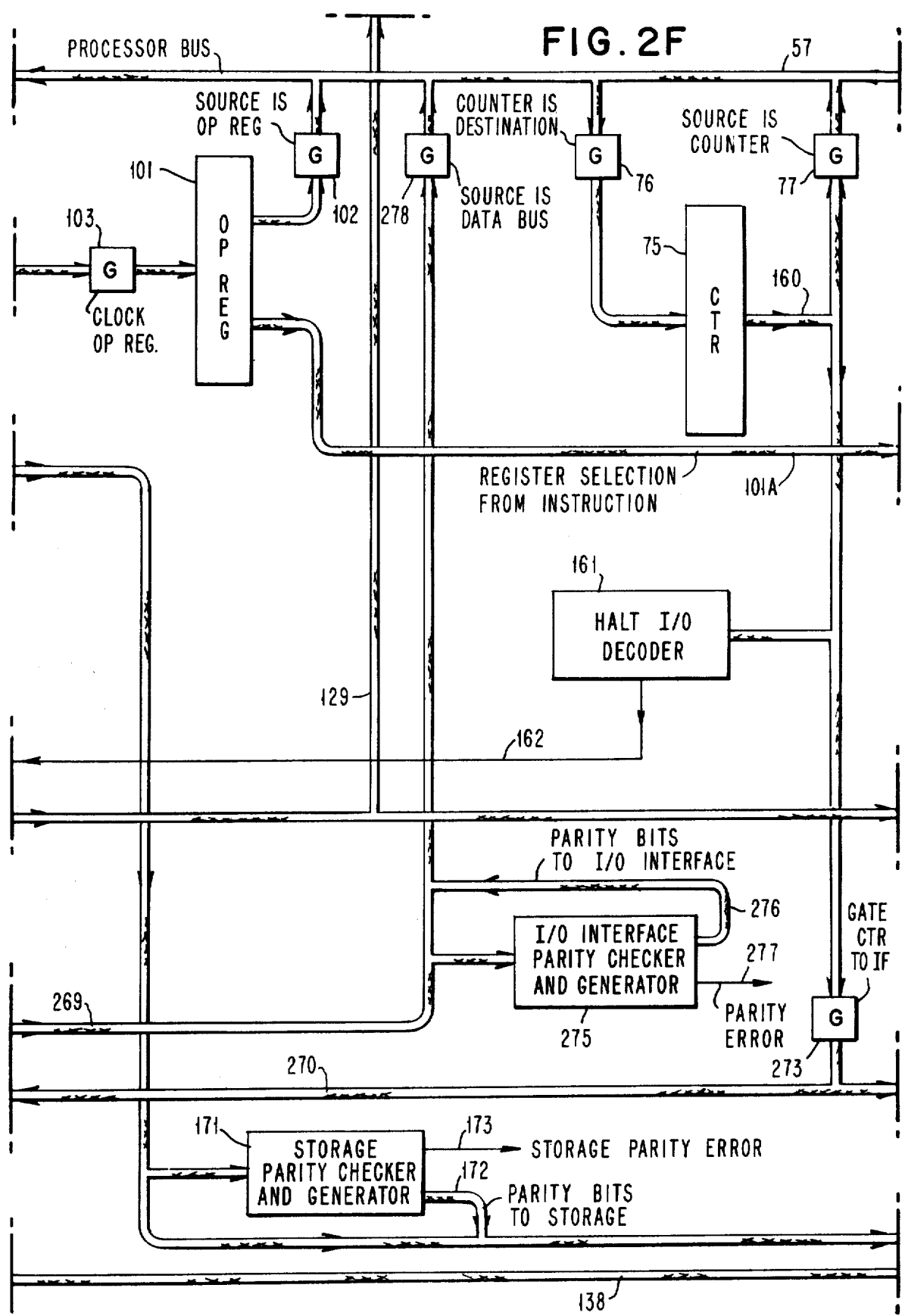

DATA PROCESSING SYSTEM FEATURING SUBROUTINE LINKAGE OPERATIONS USING HARDWARE CONTROLLED STACKS

RELATED PATENT APPLICATIONS

Application Ser. No. 682,229, filed Apr. 30, 1976 herewith by M. A. Bouknecht, M. I. Davis and L. P. Vergari, entitled "Input/Output Interface Logic for Concurrent Operations," and assigned to the assignee herein, describes and claims the preferred form of the controls associated with the preferred form of the controls associated with the present processor, I/O devices, channel and I/O interface for transferring data to and from the I/O devices and said application is incorporated herein by reference as if it were set forth herein in its entirety.

Application, Ser. No. 681,984, filed Apr. 30, 1976 herewith by R. E. Birney and M. I. Davis entitled "Key Register Controlled Accessing System" and assigned to the assignee herein, describes and claims the preferred form of the addressing control associated with the present processor and main storage, and said application is incorporated herein by reference as if it were set forth herein in its entirety.

The present application is also related to the following other applications, each of which is incorporated herein by reference as if it were set forth herein in its entirety.

| Serial No./ Filing Date | Title | Inventor(s) |
|---|---|---|
| 681,982/ 4/30/76 | Address Key Register Load/Store Instruction Register | R. E. Birney M. I. Davis L. A. Graybiel R. A. Hood S. Kahn W. S. Osborne |
| 682,222/ 4/30/76 | Key Controlled Address Relocation Translaton System | R. E. Birney M. I. Davis L. A. Graybiel R. A. Hood S. Kahn W. S. Osborne |
| 682,223/ 4/30/76 | Outer and Asynchronous Storage Extension System | D. G. Bourke F. J. Puttlitz |
| 682,221/ 4/30/76 | Equated Operand Address Space Control System | R. E. Birney R. A. Hood |
| 682,224/ 4/30/76 | Non-Translatable Storage Protection Control System | R. E. Birney M. I. Davis |
| 681,985/ 4/30/76 | Supervisor Address Key Control System | R. E. Birney M. I. Davis R. A. Hood T. A. McDermott L. E. Wise |
| 682,226/ 4/30/76 | System for Controlling Address Keys Under Interrupt Conditions | R. E. Birney L. A. Graybiel W. S. Osborne |
| 681,953/ 4/30/76 | Task Management Apparatus | M. I. Davis |
| 681,983/ 4/30/76 | Common Polling Logic For Input Output Interrupt or Cycle Steel Data Transfer Requests | M. A. Bouknecht D. G. Bourke L. P. Vergari |
| 682,228 4/30/76 | Residual Status Reporting During Chained Cycle Steal Input/Output Operations | D. G. Bourke L. P. Vergari |
| 682,227 4/30/76 | Translator Lookahead Controls | D. G. Bourke |

BACKGROUND OF INVENTION AND PRIOR ART

Stacks are basically last in - first out (LIFO) queues and their use to hold data elements is known in the art. For example, Digital Equipment Corporation and Burroughs Corporation have used LIFO stack queues to hold data elements in several of their publicly announced products. The use of stacks by Programming has been widely described, for instance, "Operating System Principles" by Per Brinch Hansen, published by Prentice Hall, pp. 162, et seq.

Stacking in previous data processing systems has been utilized predominantly for data operands. However, it is known to store return instruction addresses of subroutines in a push-down stack for controlling sequential return to unfinished subroutines. It is also known to store subroutine return addresses in a main memory. The dynamic allocation of storage space for data is an accepted technique.

SUMMARY OF THE INVENTION

In accordance with the present invention a data processing system is described, having a number of input/output devices, main storage to contain data and programs, and a Central Processing Unit (CPU). In such a system, the use by the programming system of subroutines is both customary and desirable to reduce the amount of storage required to hold the programs.

When a mainline program makes a call to such subroutines the system is operable to perform the following:

1. Store linkage and status after the call to the subroutine is made.
2. Allocate a dynamic work area (often of variable size) of main storage for the caller and typically release after use.

Software operations have been used in the prior art to perform these functions and, since the operations are quite complex, overhead is incurred in performance and greater storage space required. In the present invention the linkage to a subroutine is accomplished by one machine level instruction and hardware responsive to the execution of that instruction. The restoration of machine status and return linkage after completion of the subroutine (which took equal amounts of software instructions in previous systems) is also accomplished by a single machine level instruction and hardware means responsive to the execution of that instruction.

Objects

Accordingly, a primary object of the present invention is to simplify, procedures in a data processing system for linking to and returning from subroutines.

Still another object of the present invention is to provide a system of this nature, wherein minimum storage is required for a function of this nature, and wherein the operation is greatly simplified.

An additional object of this invention is to provide automatic checking of the operations involved in linking to subroutines and returning from subroutines in such a manner that errors in programming are detected by the hardware and reported to the software.

The foregoing and other objects, features and advantages of the invention will be apparent from the following more particular description of the invention as illustrated in the accompanying drawings.

DRAWINGS

In the drawings:

FIG. 1 is a block diagram of a data processing system incorporating the subroutine linkage procedures in accordance with the present invention.

FIGS. 2A-2H comprise a more detailed representation of the Central Processing Unit (CPU) illustrating the major components and data flow of a preferred form of processor.

Figure 3:
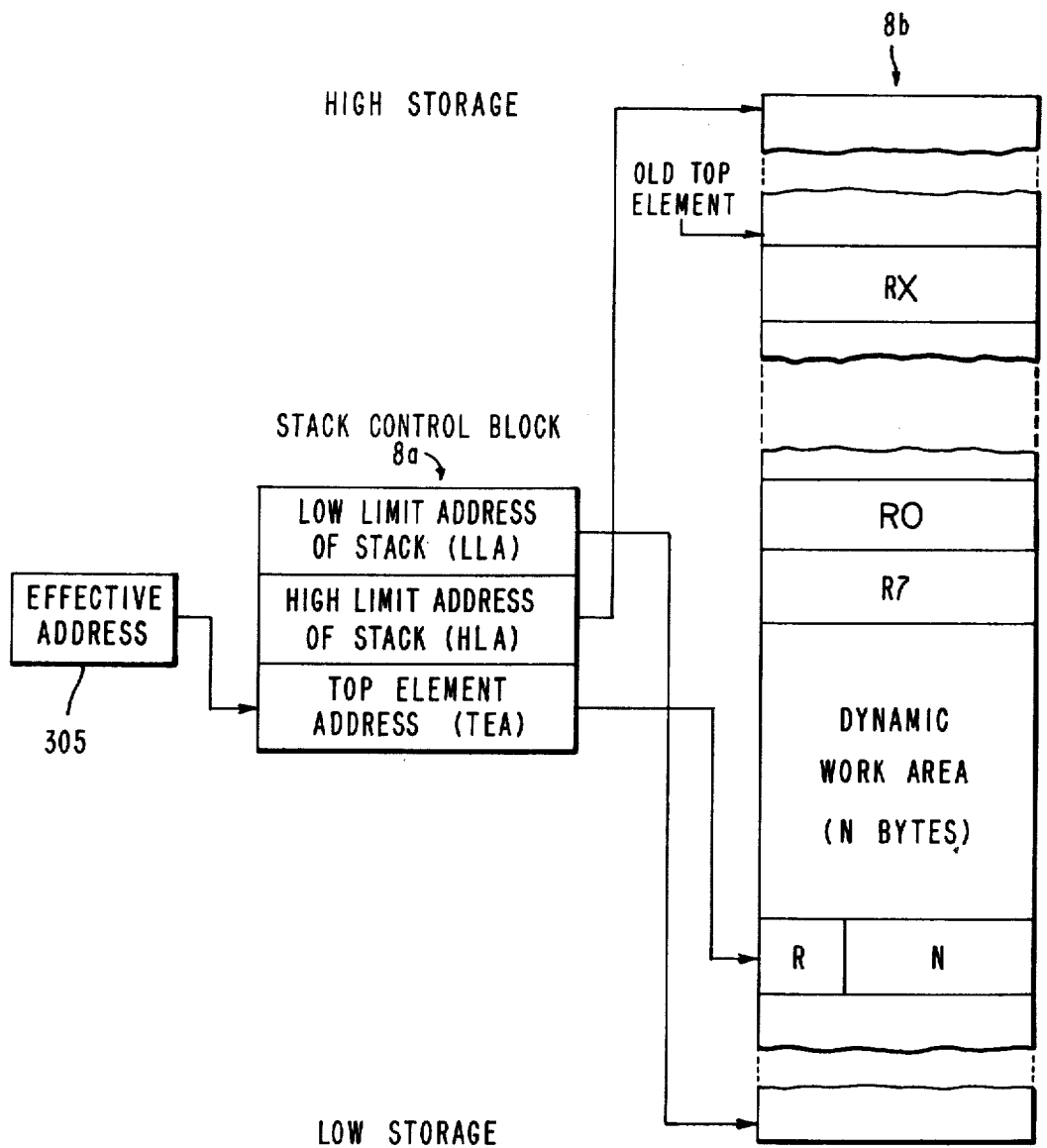

FIG. 3 shows the organization in main storage of one of a possible plurality of subroutine linkage stacks. One element in the stack is shown and the stack control block, which performs the control functions over the entire stack, is also depicted.

GENERAL DESCRIPTION OF THE SYSTEM

FIG. 1 is an overview block diagram of a preferred system within which the present improvement is incorporated.

The central processing unit (CPU), or processor 1, is the primary element of the system and is shown in more detail in FIGS. 2A-2H. It executes instructions and controls activity on the two primary interfaces of the system, the input/output (I/O) Interface 2 and the storage/translator interface 3.

A plurality of input/output (I/O) devices 4-1 to 4-n are coupled to the I/O interface 2 by way of respective device attachments 5-1 to 5-n. The device attachments 5-1 to 5-n, together with the CPU 1, control the transfer of data between the CPU 1 and the I/O devices, 4-1 to 4-n.

The storage translator interface 3 couples the CPU 1 to a main storage 8 and to a relocation translator 9. An interface 11 couples the relocation translator 9 to an asynchronous storage 10. The main storage 8 includes an inner storage section 14 and an outer storage section 15. An interface 12 couples the CPU 1 to the main storage 8 for controlling the transfer of data between the CPU and the inner storage 14. An outer storage interface 13 couples the main storage 8 to the relocation translator 9 for controlling the transfer of data between the CPU 1 and the outer storage 15.

An operator console 6 is coupled to the CPU 1 by way of an interface 7.

The interface 2 includes an I/O address bus, an I/O data bus, and I/O interface control signals which will be described in greater detail with respect to FIGS. 2A-2H. The interface 3 includes a main storage bus and CPU/translator control signal busses. The interfaces 12 and 13, respectively, provide a path for inner storage control signals and outer storage control signals during data transfers. The interface 11 includes a data bus out and a data bus in, together with interface control signal lines. To the extent that these interfaces are pertinent to the subject matter of the present improvement, they will be described below.

CPU Data Flow (FIGS. 2A - 2H)

The CPU 1 includes an arithmetic and logic unit (ALU) 51 (FIG. 2E) of conventional construction. A pair of input registers are provided for the ALU 51, i.e. the WA register 52 and the Y register 53, which registers are coupled to the ALU 51 by way of buses 54 and 55, respectively. The ALU 51 includes an output bus 56 which is coupled to the processor bus 57 by way of an AND gate 58. The processor bus 57 is coupled to the registers 52 and 53 by way of AND gates 60 and 61 to provide input data to the ALU 51.

The processor bus 57 acts as the main data bus for both source and destination data. Therefore, each of the functional components of the processor, which acts as the source, is coupled to the processor bus 57 by way of an AND gate; and each functional component of the CPU 1, which acts as a destination, is coupled to the processor bus by way of a respective AND gate. Most of the functional components of the system act as both a source and a destination for data; and, therefore, are coupled to the processor bus 57 by both source AND gates and destination AND gates.

Thus, the processor bus 57 is coupled to a Z register 65 by way of a destination AND gate 66 and a source gate 67, to a processor storage data register 70 by way of a destination AND gate 71 and a source AND gate 72, to a counter 75 by way of a destination AND gate 76 and source AND gate 77, to a register stack 80 by way of a destination AND gate 81 and a source AND gate 82, to an address key register 85 by way of a destination AND gate 86 and a source AND gate 87 to a hardware level status register 90 by way of a destination AND gate 91 and a source AND gate 92, and to a processor storage address register 95 by way of a destination AND gate 96 and a source AND gate 97.

The processor bus 57 is coupled to the console 6 (FIG. 2A) by way of a source AND gate 100 and interface bus 7a. Data is directed from the processor bus 57 to the console 6 way way of the AND gate 66, the Z register 65, and the interface bus 76. An operation (O) register 101 (FIG. 2F) is coupled to the processor bus 57 by way of a source AND gate 102. Operation codes are stored into the OP Reg. 101 from the processor storage data register 70 by way of an AND gate 103. A stack address register 105 (FIG. 2G) is coupled to the processor bus 57 by way of a destination AND gate 106. A current instruction address register 107 is coupled to the processor bus 57 by way of a source AND gate 109. The input of the register 107 is coupled to the output of the stack registers 80 by way of a bus 108. A storage protect array 110 (FIG. 2H) is coupled to the processor bus 57 by destination and source AND gates 111 and 112.

A program status word (PSW) register 115 has its output 116 coupled to the processor storage bus 57 by a source AND gate 117. Inputs to the register 115 are provided from various system check input lines 120, from a key compare register 121 and from a storage check condition bus 136.

Inputs to the key compare register 121 are provided by the storage protect array register 110 by way of the output bus 125 of array 110 and from a key select logic circuit 126 by way of a bus 127. The output 128 from the register 85 is coupled to one input of the circuit 126. The second input 129 to the circuit 126 is provided by cycle steal protect latches 130 (FIG. 2D). The input bus 129 from the latches 130 is also coupled to the register 90. The output 127 of the key select logic circuit 126 is also coupled to the main storage 8 and relocation translator 9 by way of the output bus 127 which forms a part of the storage/translator interface 3.

The interface 3 also includes a synchronization bus 135 (FIG. 2H), the check condition bus 136, an address bus 137, and input and output buses 138 and 139. The output 140 of the processor storage address register 95 is coupled to the address bus 137 by way of an AND gate 141. The cycle steal storage address register 142 has its output 143 coupled to the address bus 137 by way of an AND gate 144.

A zero detect circuit 150 (FIG. 2C) has its input coupled to the processor bus 57 and its output 151 coupled to a conditional branching logic circuit 152 (FIG. 2A). The output 151 of the zero detect circuit 150 is also coupled to the input of a result indicator circuit 153 (FIG. 2G). A second input 154 to the result indicator circuit 153 is derived from the output of the ALU 51.

The processor bus 57 also forms an input to the conditional branching logic circuit 152.

The output 160 of the counter 75 (FIG. 2F) provides inputs to a Halt I/O decoder 161 and to the cycle steal storage addresses register 142. The output 162 of the decoder 161 is coupled to an iterface gate control circuit 239 (FIG. 2D). The input data bus 138 from main storage is coupled to the processor storage data register 70 (FIG. 2E) by way of an AND gate 165 and to a cycle steal storage data register 166 by way of an AND gate 167. The output 168 from the processor storage data register 70 is coupled to the output data bus 139 to main store by way of an AND gate 169. The register 166 is coupled to the bus 139 by way of an AND gate 170. The outputs of register 70 and 166 are also coupled to a storage parity check 171 (FIG. 2F). The circuit 171 provides parity bits to the output data bus 139 when no parity error exists and provides an output signal on line 173 when a storage parity error is detected.

A mask register 175 (FIG. 2A) is coupled to the processor bus 57, bits 12, 13, by way of input and output gates 176, 177. The output 178 of the mask register 175 is also coupled to a current level register by way of driver circuits 180 and a bus 182a.

A selected level register 185 is coupled to the processor bus 57, bits 14, 15, by way of an input. An output 185a of register 185 is coupled to the stack SAR 105 (FIG. 2G) by way of a gate 185b. The output 185a is also coupled to the current level register 181 by way of decoder circuits 190 and the output 191 of the decoder circuits 190. The output 192 of the current level register 181 is coupled to the Read Only Storage Address Register (ROSAR) 193 (FIG. 2B) of a microprogram control mechanism 200 of the CPU 1. The output 181a of the register 181 is coupled to the stack SAR 105 by way of gate 181b after being encoded from four to two bits by encoder 181c.

The microprogram control mechanism 200 includes a Read Only Storage (ROS) 201, which is coupled to the processor bus 57 by way of the ROS output data register 202 and source AND gate 203. A second output 204 of the ROS output data register 202 is coupled to a source decoder logic circuit 205, a destination decoder logic circuit 206, a storage control decoder logic circuit 207, an ALU function decoder logic circuit 208, other control decoder logic circuits 209, and the ROSAR 193.

Address selection for the ROS 201 is provided from the ROSAR 193 via bus 212 and an address decoder logic circuit 213. A link register 1 210 and a link register 2 211 have their inputs coupled to ROS 193 via bus 212 and have their outputs 214, 215. The processor storage data register 70 (FIG. 2E) provides another input to ROSAR 193 via bus 73. The conditional branching logic 152 provides an input to ROSAR 193 via bus 216.

The source decoder circuits 205 includes output source control lines 231, which are utilized to control the various source AND gates (such as gate 102) to access source data. The destination decoders 206 include output destination control lines 232, which control various destination AND gates (such as gate 76) to direct destination data to the proper registers or other components. The ALU function decoder circuits 208 include output ALU function lines 233, which are utilized to control the various functions of the ALU during processor cycles. These destination controls, source controls and ALU function controls will be described in greater detail below, insofar as they are related to the improvement of the present application.

The storage control decoder logic circuits 207 have an output 235 coupled to a storage control circuit 236. The circuit 236 includes a second input 237 derived from the decoder circuits 209 and a third input 238 from the channel interface gate control circuits 239 (FIG. 2D). This bus 238 is bidirectional and is utilized during data transfers between the I/O devices 4-1 to 4-10 and the CPU 1. The interface bus 12 and the synchronization bus 135 are both coupled to the storage controls logic circuit 236.

The decoder circuits 209 have a state control output 240, a sample interrupt request output 241, and a check condition output 242. In addition an output 243 from the decoder circuits 209 is coupled to a clock controls circuit 245 (FIG. 2C). A crystal oscillator 246 provides signals to a frequency divider 247 which in turn is coupled to the input of the clock controls circuit 245 to provide the timing pulses for the data flow and controls of the CPU 1. These timing pulses to the CPU data flow and controls are provided by way of output lines 248-1 - 248-N of the clock controls circuit 245. The synchronization bus 135 is coupled to the clock control circuit 245 and is a two-way communications bus for this purpose.

The channel hardware 250 (FIGS. 2A, 2D) will now be described in detail. The channel hardware 250 includes a plurality of driver and receiver circuits 251 to 256, inclusive, which are coupled to the various lines and buses of the I/O interface 2. Thus, the receiver 251 is coupled to a request in bus 261, bits 0-3. The receiver 252 is connected to a request in bus 262, bit 16. A group of receiver and driver circuits 253 are connected to the poll line 263, the poll return line 264 and the burst return line 265. The driver circuit 254 is coupled to the poll identifier bus 266, bits 0-4. The driver and receiver circuits 255 are coupled to lines 267-1 to 267-10, inclusive, which are the service gate line, the service gate return line, address gate line, address gate return line, data strobe line, hold or machine check line, system reset line, word/byte indicator line, input/output indicator line, and cycle steal status bus, bits 0-3, respectively. The receivers 256 are connected to a condition code input bus 268, bits 0-2. The interface 2 also includes a data bus 269, an address bus 270, bits 0-15, an address bus bit 16 line 272 and a power on reset line 271.

The data bus 269 is coupled to the input of an I/O interface parity checker and generator circuit 275. The circuit 275 includes a first output 276 which provides parity bits to the I/O interface data bus 269 when no error exists in data transmitted from an I/O device into the CPU 1. The circuit 275 includes a second output 277 which provides a signal when a parity error occurs on the data bus 269. The data bus 269 is also coupled to the processor bus 57 by way of a source AND gate 278. The data bus 269 is coupled to the input of the cycle steal storage data register 166 by way of an AND gate 280 and is coupled to the output of the cycle steal storage data register 166 by way of an AND gate 279. The data bus 269 is coupled to the output 55 of the Y register 53 by way of an AND gate 281.

The address bus 270 is coupled to the input of the cycle steal storage address register 142. The address bus 270 is also coupled to the output 160 of the counter 75 by way of a gate 273.

The output 182b of receiver circuits 251 is coupled to an input of the current level register 181 via AND gate 187c, the other input of which is the mask driver output 182a. The driver and receiver circuits 252, 253, 254 are coupled to a poll sequence control circuit 285. The current level register 181 provides another input to the circuit 285 via output 181a. A request acknowlege line 286 provides a further input to the poll sequence control circuit 285. The poll sequence control circuit 285 is also coupled to the interface gate control circuit 239 by way of a line 289. An interface sequence ad timeout check control circuit 288 is coupled to the poll sequence control circuit 285 by way of a line 287. The power on reset line 271 provides an additional input to the circuit 285.

Lines 290-1 to 290-10 couple the driver and receiver circuits 255 to the interface gate control circuit 239.

The processor bus 57 is a 16 bit wide bus for conveying information between source and destination elements in the CPU data flow as selected by the microprogram controls.

The operation register (OP REG) 101 is a 16 bit register which contains the first word of the instruction, including register address arguments for the register stack 80, during instruction decode. It is also used as a temporary data register when not holding the first word of the instruction. Its output is a source element to the processor bus 57. It receives its input from the storage data register 70.

The ALU 51 is a bit element which performs arithmetic and logical functions as specified by the instructions. Its output 56 is a source element to the processor bus 57. It receives its input from the WA and the Y registers 52, 53.

The WA register 52 is a 16 bit register which is the primary input to the ALU 51 for arithmetic and logic operations. It receives input as a destination element from the processor bus 57.

The Y register 53 is a 16 bit register which is the secondary input to the ALU 51 for arithmetic and logic operations. In conjunction with the Wa register 52, it performs shifting on double word shift operations. It receives input as a destination element from the processor bus 57. This register 53 also provides the data path for outbound data to the I/O data bus 269 for direct program control I/O operations.

The processor storage data register (PROC SDR) 70 is a 16 bit register through which all data to or from main storage, except cycle stealing data, is gated. The first word of every instruction that is fetched from main storage 8 is gated through the PROC SDR register 70 to the OP register 101. This register 70 is also used as a temporary data register during other processor operations. Therefore, it can receive input as a destination element from the processor bus 57 and outputs as a source element to the processor bus 57.

The cycle steal storage data register (CS SDR) 166 is a 16 bit register through which all data is gated to and from main storage 8 via the I/O data bus 269 and either the in or out storage bus 138 or 139 during cycle steal operations.

The low order 8 bits of the 16 bit counter (CTR) 75 are used as a counter for keeping track of various processor operations. It is also used as a temporary register for other processor operations. Therefore, it is a source and destination element for the processor bus 57. It is also used to hold the device address for device selection and the I/O command is gated via gate 273 to the I/O address bus 270 during direct program control operations.

The processor storage address register (PROC SAR) 95 is a 16 bit register used primarily to hold a main storage address. Its contents are gated via gate 141 to the storage address bus 137 for storage accesses during normal processing and direct program control operations. It is also used as a temporary data register when not needed for addressing main storage.

The cycle steal storage address register (CS SAR) 142 is a 16 bit register used to hold a main storage address transferred via the I/O address bus 270 from the I/O device during cycle steal data transfer operaitons. It is gated via gate 144 to the storage address Bus 137 for cycle steal storage accesses only.

The primary purpose of the 16 bit Z register 65 is to hold the data for the operator data display indicators (not shown) of the console 6. It is also used as a temporary register for other processor operations. It is a source and destination element for the processor bus 57.

The register array (stack) 80 (FIG. 3) is an array of monolithic latches used to hold the registers, level status, address keys and instruction address for each of the four interrupt levels. It also contains certain working registers used by the microprogram, i.e., the TEMP, TEMP1-3, DBUF, SOA1, SOA2, current level save and AKR save, organized as shown in FIG. 3 of Application Ser. No. 681,953.

The TEMP and TEMP1-3 registers contain temporary data used by the microprogram during normal processing. SOA1 contains the manually entered address to be used for stop-on-address operations and SOA2 contains the console storage key in the low three bits, the remaining bits are zero. The DBUF register is the console data buffer. The contents of this buffer drives the data display indicators (not shown) on the console 6. The current level register contains the level that was active when stop state was entered. The AKR save register contains a copy of the current level AKR.

The data in the LSR, AKR and IAR registers of the stack 80 for the current level are also held in the corresponding hardware registers 90, 85, 107 for performance reasons, i.e., to reduce the number of stack accesses. The stack 80 of the preferred embodiment is comprised of two 64×9 arrays connected in parallel to form a 64×18 array.

The stack address register 105 is a 6 bit register for addressing the stack 80. Inputs to register 105 are provided from an incrementer 320 via a stack link register 321 and a destination gate 322, the selected level register 185 via bus 185a and gate 185b, the current level register 181 via bus 181a and gate 181b, from the OP register 101 via bus 101a and gate 101b, and the processor bus 57. The stack address register 105 is loaded from the processor bus 57 via gate 106.

The hardware level status register (LSR) 90 is a 16 bit hardware register used to hold the current level status. During processing on a specific level, the contents of the hardware register LSR 90 change as the result of arithmetic and logical operations. The current level LSR in the register stack 80 remains unchanged until a level exit occurs. At this time, the hardware LSR register 90 contents are placed into the LSR register in the register stack 80 of the level being exited; and the new level status from the register stack 80 is placed into the hardware LSR register 90.

Certain of the contents of the LSR register 90 are as follows:

TABLE 1

| Level Status Register | |
|---|---|
| Bit | Meaning |
| 0 | Even Indicator |

TABLE 1-continued

Level Status Register

| Bit | Meaning | |
|---|---|---|
| 1 | Carry Indicator | |
| 2 | Overflow Indicator | Result Indicators |
| 3 | Negative Result Indicator | |
| 4 | Zero Result Indicator | |
| 8 | Supervisor State | |
| 9 | In Process | State Controls |
| 10 | Trace | |
| 11 | Summary Mask | |

The result indicators are used by software for decision-making.

The even, carry, and overflow indicators are also used by I/O operations to hold the condition codes sent to the processor 1 by the I/O devices 4-1 to 4-n.

During an I/O instruction execution the even, carry and overflow indicators are assigned the following condition code values:

TABLE 2

| Condition Code | Even | Carry | Overflow | Meaning |
|---|---|---|---|---|
| 0 | 0 | 0 | 0 | Device Not Attached |
| 1 | 0 | 0 | 1 | Busy |
| 2 | 0 | 1 | 0 | Busy After Reset |
| 3 | 0 | 1 | 1 | Command Reject |
| 4 | 1 | 0 | 0 | Intervention Required |
| 5 | 1 | 0 | 1 | Interface Data Check |
| 6 | 1 | 1 | 0 | Controller Busy |
| 7 | 1 | 1 | 1 | Satisfactory |

During interrupt acceptance all condition codes are reported by the device. The even, carry and overlow indicators are assigned the following condition code values:

TABLE 3

| Condition Code | Even | Carry | Overflow | Meaning |
|---|---|---|---|---|
| 0 | 0 | 0 | 0 | Controller End |
| 1 | 0 | 0 | 1 | PCI |
| 2 | 0 | 1 | 0 | Exception |
| 3 | 0 | 1 | 1 | Device End |
| | 1 | 0 | 0 | Attention |
| 5 | 1 | 0 | 1 | Attention and PCI |
| 6 | 1 | 1 | 0 | Attention and Exception |
| 7 | 1 | 1 | 1 | Attention and Device End | where PCI is a program controlled interrupt.

TABLE 4

Level Status Register Bit Definitions

| Bit | | |
|---|---|---|
| 0 | Even Indicator | Set to one if the low order bit of the result is zero; otherwise set to zero. |
| 1 | Carry Indicator | Set to one if the result of add or subtract operations cannot be represented as an unsigned number; otherwise set to zero. |
| 2 | Overflow Indicator | Set to one if the result of an arithmetic operation cannot be represented as a signed number; otherwise set to zero. |
| 3 | Negative Indicator | Set to one if bit 0 of the result is one; otherwise set to zero. |
| 4 | Zero Indicator | Set to one if the result is all zeros; otherwise set to zero. |
| 8 | Supervisor State | Set to one whenever the processor 1 enters supervisor state. Supervisor state is entered when:<br>- A supervisor call instruction is executed.<br>- A class interrupt occurs.<br>- An I/O interrupt is accepted. |
| 9 | In Process | This bit is set or reset by the corresponding bit in the LSR of the storage level status block (LSB) whenever the load level status block (LLSB) instructon is executed. The LLSB loads an LSB from storage 8 into the designated level LSB in the stack 80. |
| 10 | Trace | This bit is set or reset by the corresponding bit in the LSR register of the storage LSB whenever the local level status block instruction is executed. The LLSB loads an LSB from storage 8 into the designated level LSB in the stack 80. |
| 11 | Summary Mask | When the summary mask = 0, all priority interrupts on all levels are disabled. When the summary mask = 1, all priority interrupts on all levels are enabled. The summary mask is set to one (enabled) by the following:<br>- Execution of the enable instruction with bit 15 = 1.<br>- System Reset, Power-On Reset, IPL.<br>- Execution of an LLSB instruction with bit 11 of the storage LSR = 1.<br>- Acceptance of a priority interrupt on the interrupted to level.<br>The summary mask is set to zero (disabled) by the following:<br>- Execution of the supervisor call (SVC) instruction.<br>- Execution of the disable instruction with bit 15 = 1.<br>- Any class interrupt:<br>    Machine Check<br>    Program Check<br>    Soft Exception Trap<br>    Power Thermal Warning<br>    Supervisor Call<br>    Trace<br>    Console<br>- Execution of the LLSB instruction with bit 11 of the storage LSR = 0. |

The processor 1 does not regard numbers as either signed or unsigned, but performs the designated operation on the values presented. All indicators reflect the result of the operation. This allows the programmer to test results for the type of operation performed.

The processor status word (PSW) register 115 is a 16 bit register which contains error and exception information that causes a program check, machine check, soft exception trap, or power thermal warning class interrupt to occur. Three status flags are also contained in the PSW register 115. The PSW register 115 is set by hardware and microprogram-detected conditions.

TABLE 5

Processor Status Word

| | Bit | Meaning |
|---|---|---|
| Program Check | 0 | Specification Check |
| | 1 | Invalid Storage Address |
| | 2 | Privilege Violate |
| | 3 | Protect Check |
| | 4 | Invalid Function (either program check or soft exception) |
| Soft Exception Trap | 5 | Floating Point Exception |
| | 6 | Stack Exception |
| | 7 | Reserved |
| Machine Check | 8 | Storage Parity Check |
| | 9 | Reserved |
| | 10 | CPU Control Check |
| | 11 | I/O Check |
| Status Flags | 12 | Sequence Indicator |
| | 13 | Auto IPL |
| | 4 | Translator Enabled |
| Power/Thermal | 15 | Power/Thermal Warning |

The address key register (AKR) 85 (FIG. 2G) is a 16 bit hardware register used to contain the contents of the current level AKR during processing on that particular level. The AKR register 85 provides the address key which is compared in circuit 121 against the protect key in the storage protect array 110. This is done for each storage access except for cycle steal operations. The instruction space key (ISK) field of the AKR is also used as the console address key for any manual storage accesses from the console 6.

TABLE 6

| Address Key Register | |
|---|---|
| Bit | Meaning |
| 0 | Equate Operand Spaces |
| 5 | Operand 1 Key bit 0 |
| 6 | Operand 1 Key bit 1 |
| 7 | Operand 1 Key bit 2 |
| 9 | Operand 2 Key bit 0 |
| 10 | Operand 2 Key bit 1 |
| 11 | Operand 2 Key bit 2 |
| 13 | Instruction Space Key bit 0 |
| 14 | Instruction Space Key bit 1 |
| 15 | Instruction Space Key bit 2 |

The current instruction address register (CIAR) 107 (FIG. 2G) contains the address of the instruction being executed. The CIAR register 107 is loaded at the beginning of each instruction. During the execution of the instruction, the level IAR in stack 80 is updated to the next instruction address. Should a class interrupt stop the current instruction from being fully executed, the class interrupt is handled, then the CIAR register 107 is used to readdress the interrupted instruction which is executed again.

The storage protect array 110 (FIG. 2H) consists of the 32 storage key registers (not shown). The array is enabled whenever the storage protect feature is installed and enabled. Each register contains the protect key and the read only bit for controlling a two thousand 48 byte block of storage 8. The set storge key instruction sets the key and read only bit into a specific storage key register. The copy storage key instruction reads out a specific storage key register.

The current level register 185 (FIG. 2A) consists of a 2 bit register which is used to hold the current level indicator that is presently in effect. The register 185 is set whenever the level is changed. The register 185 is used in addressing the proper level status block in the local storage stack 80 and is also used to determine if an interrupt may be accepted. For this latter purpose, a 2 to 4 bit level decoder 190 is used. The register 185 is a source and destination element for the processor bus 57.

The mask register 175 (FIG. 2A) is a four bit register which is used to enable and disable priority interruptions on the four interrupt levels, as follows:

TABLE 8

| Bit 0 = 0 Level 0 | Interruptions disabled |
|---|---|
| Bit 1 = 0 Level 1 | Interruptions disabled |
| Bit 2 = 0 Level 2 | Interruptions disabled |
| Bit 3 = 0 Level 3 | Interruptions disabled |
| Bit 0 = 1 Level 0 | Interruptions enabled |
| Bit 1 = 1 Level 1 | Interruptions enabled |
| Bit 2 = 1 Level 2 | Interruptions enabled |
| Bit = 1 Level 3 | Interruptions enabled |

The mask register 175 is set by the load mask instruction. It is a source and destination element for the processor bus 57.

The mask register outputs 178 are also connected to the mask unloaded drivers 180 which permits the ANDing of the four bits of mask register 175 with the appropriate priority interrupt request bits from the I/O interface receivers 251 and bus 261 for use in establishing interrupt acceptance action.

A crystal oscillator 246 generates the basic clock frequency for the CPU 1. A frequency divider 247 generates the free-running clock pulses A, B, C and D.

The up level indicates logical 1. Each pulse is active for 55 nanoseconds once every 220 nanoseconds.

The clock controls 245 control the stopping and starting of the gate clock pulses, distribute the clock pulses to the data flow and controls, and generate certain special clock pulses, for main storage timing. The gated clock pulses are of the same form as the A, B, C and D pulses described above, but may be stopped and started by conditions arising in the microprogram as hardware.

The Bus Zero Detect logic 150 is a group of combinatorial logic elements which are capable of determining whether the value on the processor bus is zero. Its output is used by the microprogram in decision-making.

The parity generator and checker circuit 171 checks for odd parity on all bytes received from main storage 8 by the CPU 1. It generates parity on all bytes sent to main storage 8 by the CPU 1. Detection of a processor cycle storage parity error sets the storage parity but in the PSW register 115 and causes a machine check class interrupt. Detection of a cycle steal cycle storage parity error causes the error condition to be signalled to the active I/O device.

The I/O Interface Parity Generator and Checker 275 checks for odd parity in all bytes received over the I/O interface data bus 2. It generates odd parity on all bytes transmitted over the I/O interface data bus 2. Detection of a parity error on inbound data causes the error condition to be signalled to the active I/O device.

The Halt I/O decoder 161 decodes the Halt I/O command which is executed by the channel 250 rather than by an I/O device. It causes a reset of all I/O devices 4-1 to 4-n attached to the system.

The key selection logic 128 is used to select one of the three AKR keys in register 85 or the cycle steal key via bus 129 for main storage reference. During cycle steals, the I/O cycle steal key is transmitted to the CPU 1 on the Condition Code In Bus 268 of the I/O interface 2. The output 127 of this logic 128 is sent to the translator 9 and to the key compare logic 121.

The key compare logic 121 is used to compare the selected key with the storage protect key from the storage protect array 110. A violation causes the protect check bit in the PSW to be set and an interrupt occurs.

The poll sequence control 285 skews and generates the poll tag on line 213 and poll identifier on bus 266, provides signalling to the interface gate controls 239 for service gate operation, and is the interface device and line out controls 288 for error checking. The poll sequence is to resolve contention between multiple requesting devices for the same CPU resource.

The interface auto control 239 skews and generates the address and service gates for the interface, and provides contention resolution between same, registers cycle steal storage access errors for presentation to the device, provides line signalling to and from the storage controls, and deskews the interface buses and controls the condition code in latches 130.

The interface sequence and time out controls 288 provide the time out controls for sequence error checking on the interface 2, detects invalid combinations of interface tags and reports detection of machine check conditions on the interface to the processor 1.

The I/O interface 2 connects the CPU channel 250 to device attachments 5-1 to 5-n. It consists of the elements described below.

The I/O data bus 269 is a bidirectional bus of 16 data and two parity lines. It is used to transfer data to and from the I/O devices 4-1 to 4-n during direct program control operations and cycle stealing operations, and to transfer device address and interrupt status byte to the CPU 1 during interrupt acceptance.

The I/O address bus 270 is a bidirectional bus of 16 lines used to pass each device address for device selection and I/O commands to I/O devices 4-1 to 4-n during direct program controlled operations. It is also used to transfer main storage addresses from the active I/O device to the CPU 1 during cycle steal operation.

The I/O interface control signals on lines 267-1 to 267-10 are a group of signals used to pass condition codes to the CPU 1, to post status to I/O devices 4-1 to 4-n, to select and control IPO operations, to transfer interrupt and cycle steal requests to the CPU 1, to poll and control acceptance sequences for interrupt and cycle steal, to control resets, and to provide proper sequencing of direct program control and cycle steal operations.

The device attachments 5-1 to 5-n control and attach I/O devices 4-1 to 4-n to the I/O Interface 2. An attachment such as 5-1 may control more than I/O device such as 4-1.

The storage/translator interface 3 includes a main storage bus consisting of address bus 137 for addressing main storage 8, and to transfer logical and physical storage addresses between the CPU 1 and relocation translator 9, and busses 138 and 139 to transfer data between main storage 8 and the CPU 1 and between the relocation translator 9 and the CPU 1.

The interface 3 also includes the CPU/Translator Control Signal buses 127, 136 and 135 to transfer active address keys, check conditions and synchronization signals between the CPU 1 and relocation translator 9.

The inner storage control signal bus 12 provides physical selection of the inner storage area 14, partial array selection in the selected area, and read/write control signals properly sequenced for accessing the zero to sixty-four kilobyte range of inner main storage area 14.

The console 6 provides both operator and programmer with comprehensive access to CPU 1 data flow elements and to main storage 8. It attaches to the CPU 1 by a microprogram controlled interface integrated into the data flow of the CPU 1.

Data Stacking

It is often convenient in a computer program to organize operands into queues. This technique allows parameters to be provided by one section of a program and used by another section. Typical examples include:

1. The enqueueing of I/O device requests by a variety of requestors and the serial dequeueing and honoring of such requests by an I/O device program.

2. The arithmetic notation known as Reverse Polish, wherein operands and operators may be enqueued as received, and then dequeued in reverse order as execution proceeds.

Stacking provides a simple efficient mechanism for enqueueing data and/or parameters. Basically a stack is a Last In First Out (LIFO) queue. Operations are provided to "push" a data item or parameter into the stack and "pop" the top item from the stack. In addition, limit checking facilities are available which test for overflow and underflow of a stack area. Any contiguous area of storage may be defined as a stack. Each logical stack is defined by a stack control block in the following format:

|       | 0                                15         |
|-------|---------------------------------------------|
| E/A   | Top Element Address (TEA)                   |
| E/A+2 | High Limit Address of Stack (HLA)           |
| E/A+4 | Low Limit Address of Stack (LLA)            |

When a stack is empty, the Top Element Address is equal to the High Limit Address. The size of the stack is equal to the HLA-LLA.

When an item is "push"ed into the stack, the address value in the TEA is decremented by the length (in bytes) of the operand and compared against the LLA. If it is less than the LLA, a stack overflow exists. A soft exception check interruption occurs, with Stack Exception set in the Processor Status Word (PSW) register 115, FIG. 2H. The TEA is unchanged. If the stack does not overflow, the TEA is updated and the data item is moved to the storage location defined by the TEA.

When an item is popped from a stack, the TEA is compared against the HLA. If the TEA is greater than or equal to the HLA, an underflow condition exists. A soft exception trap interruption occurs, with the Stack Exception bit on in the PSW register 115, FIG. 2H. If the stack does not underflow, the data item defined by the current TEA is moved to a specified register and the TEA is incremented by the length (in bytes) of the operand.

Detailed Description of Subroutine Linkage Operations
Linkage Stacking

In the case of subroutine linkage stacking, in accordance with this invention, the operand consists of:

1. A set of machine status after the call to the subroutine is made (may be a partial or complete set of status).

2. A dynamic work area (of variable size) of main storage is created for the caller, and may be released after use.

Software operations have been typically used to perform these functions and, since the operation is more complex than stacking conventional data, even more overhead in performance and storage use is engenered. The present arrangement provides a mechanism at the machine language level which performs the enqueue/dequeue functions for subroutine linkages.

This facility involves the following steps:

1. Identify the queue.
2. Establish the address in main storage of the Top Element (TE) in the queue.
3. Load or store the next element.
4. Check that the designated boundaries of the queue have not been violated.
5. Update the Top Element Address (TEA) by the size of the data type just used.

Linkage Stacking

Referring to FIG. 3, a stack mechanism is used for subroutine linkage which provides a simple method of saving/restoring caller status and allocating dynamic work areas. The Store Multiple/Load Multiple and Branch instruction pair operate using a stack area in main storage 8. The Store Multiple instruction specifies a data element for use in a stack which comprises:
1. Stack Control Block Address (A)
2. Limit Register No. (Rx)
3. No. of bytes to allocate (N)
(The dynamic work area)

When Store Multiple is executed, the allocate value (N) is used to decrement the TEA before an overflow check is made. The LINK Register (R7) and registers $R_0$ through $R_x$ are saved sequentially in the stack area and the base address of the work area (or last register stored if no work area is defined) is returned to the user in register Rx. If R7 is specified, only R7 is stored. The value of Rx and N are also saved as an entry in the stack. When a Load Multiple and Branch instruction is executed, these values (Rx, N) are retrieved from the stack and are used to control the reloading of registers and restoring the stack control pointer to its former status. The contents of R7 are then loaded into the IAR, returning to the calling routine.

Store Multiple (STM)

| 0 | | | | 4 5 | 7 | 8 9 | 10 11 | 12 | 15 |
|---|---|---|---|---|---|---|---|---|---|
| 0 1 0 0 0 | | | | R | | RB | AM | | 1 0 0 0 |
| Rx | | | | N | | | | | |
| 16 | 18 | 19 | | | | | | | 31 |

The contents of registers for the current level are stored into the stack defined by the Stack Control Block pointed to by the effective address. The R field is unused and is customarily set to zero to avoid future code obsolescence. The Rx field specifies the last register to be stored, commencing with Register seven (R7) and wrapping via Register zero (R0). If Register R7 is specified, only R7 is stored.

The last register stored is then set to the address of the low storage end of the block of N words in the stack incremented by two. N is specified in bytes but must be even. A value of zero is valid. The contents of the remaining registers are unchanged.

The indicators are not affected.

Programming Note: If AM=01, the register specified by the RB field is incremented by 2.

Exceptions

Stack — The stack is full or the value of 2N is less than the number of registers to be moved plus one. The instruction is suppressed. A soft exception trap interruption occurs, with Stack Exception set in the PSW register 115.

Addressing — One or more words of the instruction or the effective address is outside the fitted storage size of the system. The instruction is suppressed. A program check interruption occurs, with Invalid Storage Address set in the PSW.

Specification — The Stack Control Block and the operand location in the stack must be on even byte boundaries. A specification check will also occur if the value of N is odd.

Protection — In the Problem State, the instruction is fetched from a partition not assigned to the current operation. The instruction is suppressed. A program check interruption occurs, with Protect Check set in the PSW.

Load Multiple and Branch (LMB)

| 0 1 0 0 0 | R | RB | AM | 1 0 1 0 |
|---|---|---|---|---|
| 0 | 4 5 7 | 8 9 10 | 11 12 | 15 |

The contents of registers for the current level are loaded from the stack defined by the Stack Control Block pointed to by the effective address. The registers to be loaded are defined by the stack entry. The next instruction will be fetched from the storage address contained in Register seven (R7).

The R field is unused and should be set to zero to avoid future code obsolescence.

Programming Note: If AM=01, the register specified by the RB field is incremented by 2.

The indicators are not affected.

Exceptions

Stack — The Stack is empty. The instruction is suppresed. A soft exception trap interruption occurs, with Stack Exception set in the PSW.

Addressing — One or more words of the instruction or the effective address is outside the fitted storage size of the system. The instruction is suppressed. A program check interruption occurs, with Invalid Storage Address set in the PSW.

Specification — The Stack Control Block, the operand location in the stack, and the instruction whose address is in Register seven must all be on even byte boundaries.

Protection — In the Problem State, the instruction is fetched from a partition not assigned to the current operation. The instruction is suppressed. A program check interruption occurs, with Protect Check set in the PSW.

Protection — In the Problem State, the instruction attempts to change an operand in main storage in a partition not assigned to the current operation. The instruction is suppressed. A program check interruption occurs, with Protect Check set in the PSW.

SUBROUTINE LINKAGE OPERATIONS

The following two tables, A and B, respectively show the steps in the microcode execution of the Store Multiple (STM) instruction and the Load Multiple and Branch (LMB) instruction by operation of the hardware in FIG. 2A - 2H.

Figure 2B:
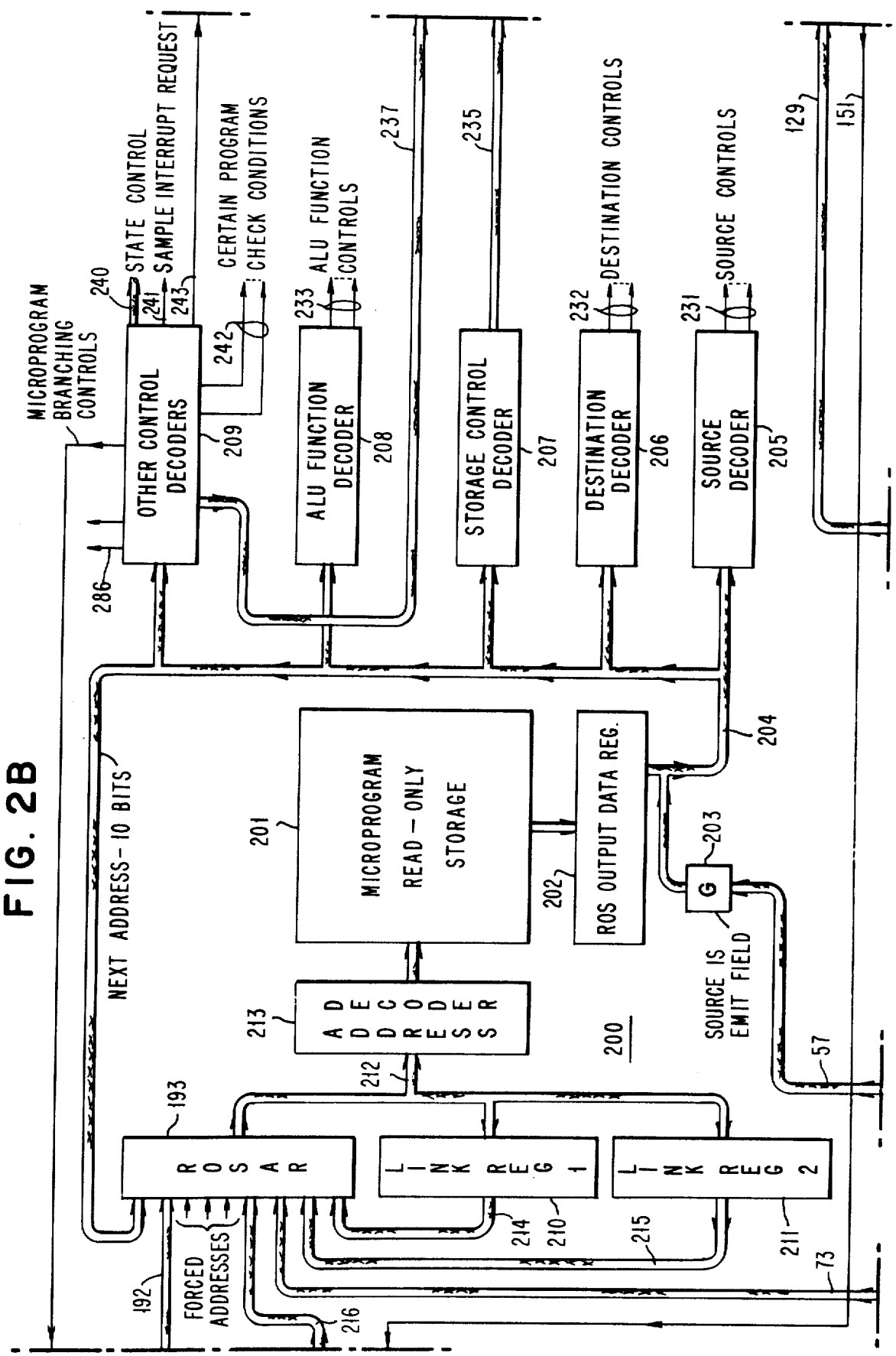
Figure 2G:
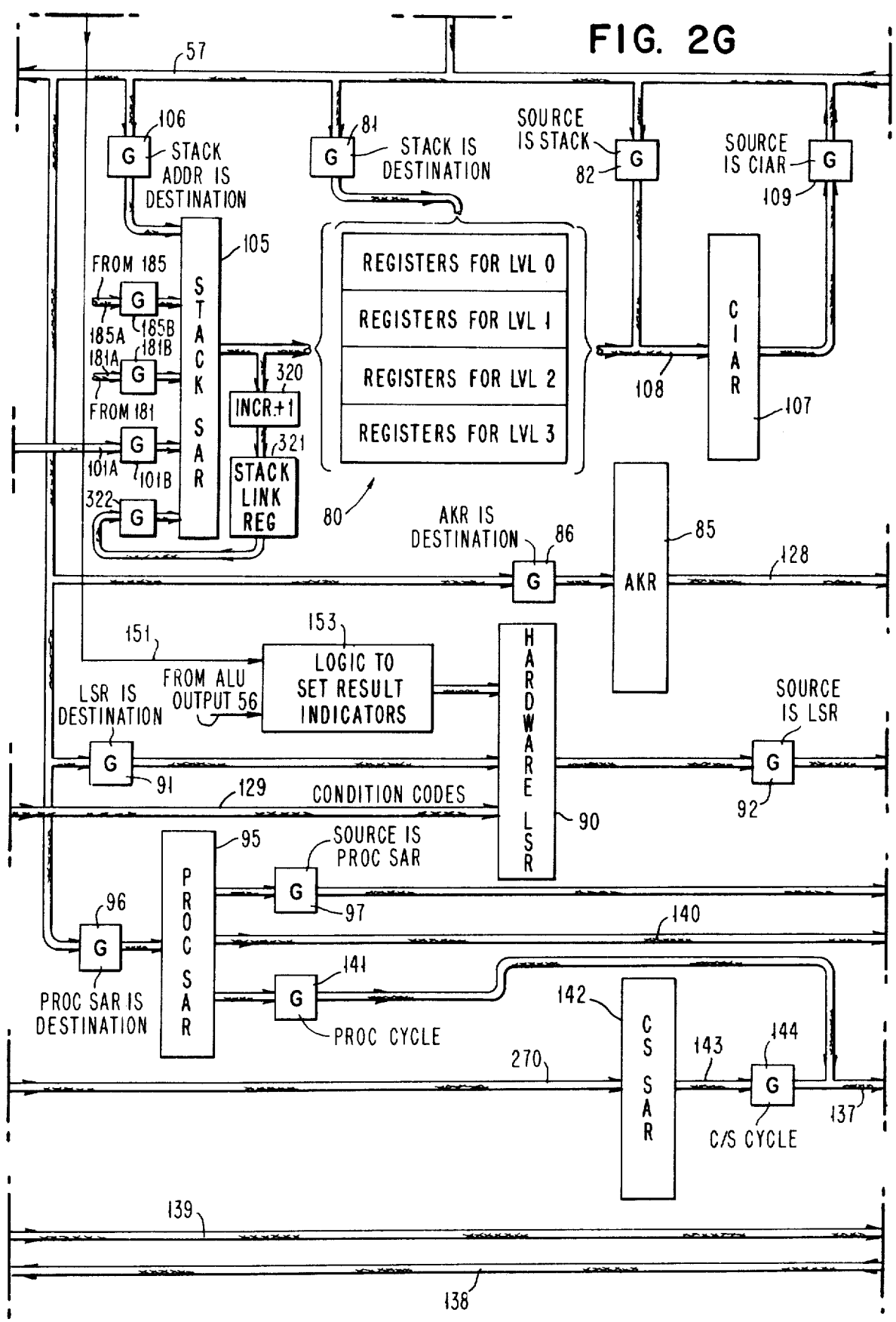
Figure 2H:
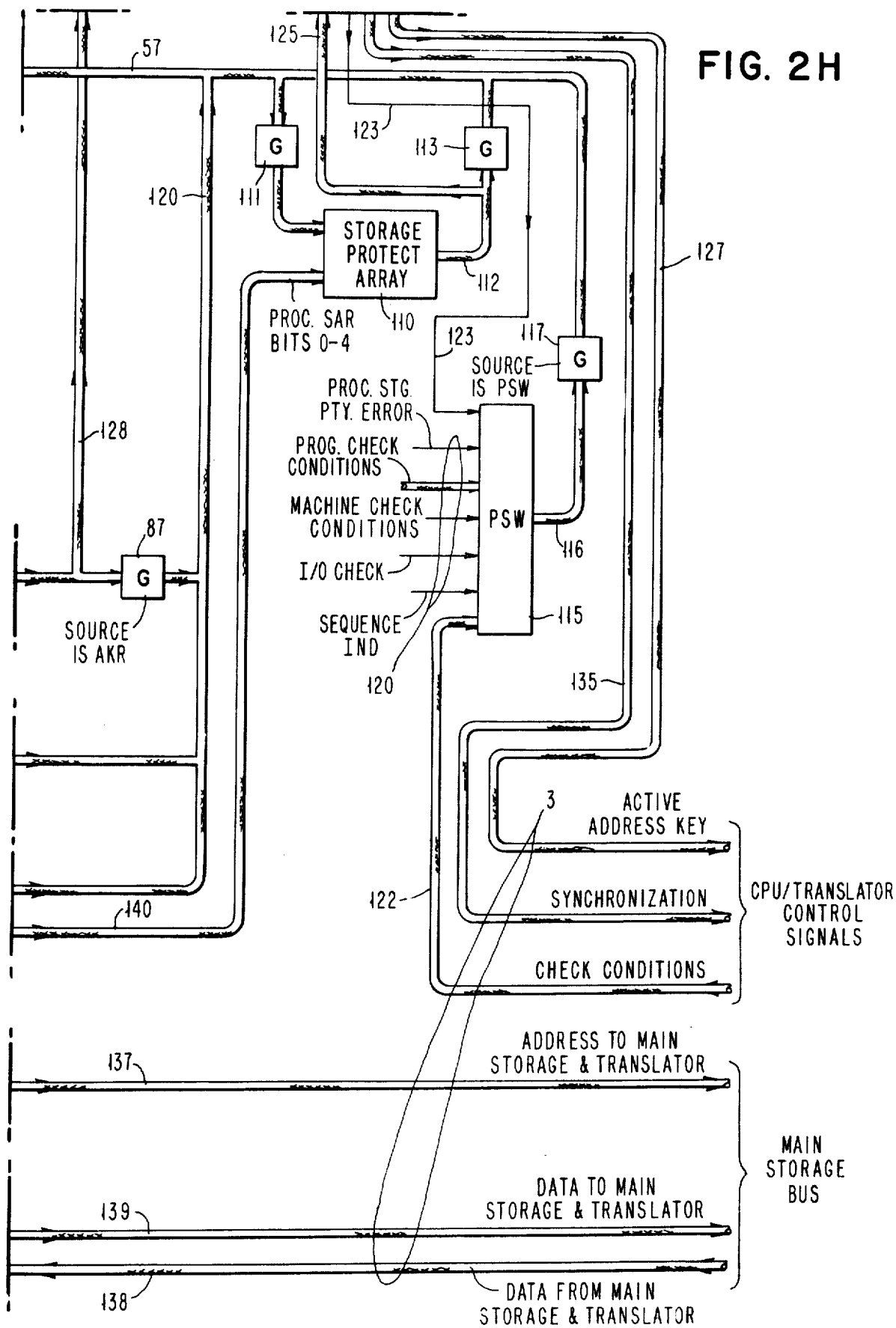

In both tables, column headings relate directly to the Read Only Storage 201 output decoders 205-209 shown in FIG. 2B. For example, the leftmost column, headed "Source," represents specific binary values decoded by the Source Decoder 205 and emitted as one of a plurality of control signals to select sources in the data flow for gating onto the processor bus 57. The second column from the left, entitled "ALU Control", represents decodes generated by the ALU function decoder 208 and is at any one time a particular binary decode from a plurality of possible decodes relating to the control of the ALU functions, e.g. AND, OR, Add, Subtract, Add 2, etc.

The third column represents the "Destination" controls and is derived from one of a plurality of possible binary decodes from the Destination decoder 206 connected to the Read Only Storage 201 output. The destination controls are used to gate information from processor bus 57 to the Destination register selected.

The fourth column, "Storage Control", describes those control signals emitted by the Storage Control decoder 207 and sent to the Storage Controls block 236 itself. The storage controls include Load Instruction Word (LIW), which loads a word from the instruction address key space of main storage, and Load Word (LW), which loads a word from the operand 2 address space. The other control associated with these two instructions is Store Word (SW), which stores a word in the operand 2 address space. The Load and Store word controls are used to access the stack and Stack Control block in main storage 8 while the Load Instruction Word is used to access both the Store Multiple (STM) and Load Multiple (LMB) instructions themselves.

The information entitled "Other" relates to the remaining collection of control signals which are decoded by the block 209 in FIG. 2B entitled "Other Control Decoders". This group of control signals includes those signals which control micro-program branching in conjunction with the Conditional Branching logic 152, shown in FIG. 2A. This is accomplished by the capability in the hardware for certain values of decode within this area of the ROS 201 output (2B) to test hardware conditions current within the system and to cause branching addressed to be placed in the Read Only Storage address register 193 (ROSAR) for use in forming the next microprogram address.

The remaining column is simply the number of the microcycles in ascending order.

It should be kept in mind that the stacks referred to are of two types — one is the stack in main storage, the other one refers to the block 80, FIG. 2, which forms the register array containing the registers for the various levels. This may itself be termed a stack on occasion, but must not be confused with the main storage stacks. Note also that the stack control block associated with the main storage stacks is itself a main storage element.

Table A shows the sequence of control signals which occur when a Store Multiple (SMP) instruction is executed. The Store Multiple instruction is used to insert an element into the stack.

TABLE A

| STORE MULTIPLE (STM) MICROCODE | | Address Mode = (RB) + A RB ≠ 0 Instruction address in WA Instruction in SDR and OP | | | |
|---|---|---|---|---|---|
| Source | ALU Control | Destination | Storage control | Other | Step |
| WA | +2 | IAR | | | 1 |
| IAR | Pass | SAR + WA | LIW | | 2 |
| WA | +2 | IAR | | | 3 |
| Stack Using RB Field (Op Reg) | Pass | Y | | | 4 |
| SDR | Pass | WA | | | 5 |
| WA & Y | Add | SAR & WA | LW | | 6 |
| WA | Pass | TEMP | | | 7 |
| SDR | Pass | Y | | | 8 |
| IAR | Pass | SAR | LIW | | 9 |
| Y | Pass | TEMP 1 | | | 10 |
| WA | +4 | SAR | | | 11 |
| EMIT 0003 | Pass | COUNTER | | | 12 |
| SDR | Pass | Y | | | 13 |
| Shift WA and Y left until counter is zero. Decrement counter. | | | | | 14 |
| WA | +1 | WA | | | 15 |
| Y | Pass | TEMP 2 | | | 16 |
| EMIT 0007 | Pass | Y | | | 17 |

TABLE A-continued

| STORE MULTIPLE (STM) MICROCODE | | Address Mode = (RB) + A RB ≠ 0 Instruction address in WA Instruction in SDR and OP | | | |
|---|---|---|---|---|---|
| Source | ALU Control | Destination | Storage control | Other | Step |
| WA.Y | AND | COUNTER & WA | | | 18 |
| Shift WA and Y left one position. | | | | | 19 |
| TEMP 2 | Pass | Y | | | 20 |
| WA & Y | Add | WA | | | 21 |
| WA | +4 | Y | | | 22 |
| TEMP 1 | Pass | WA | LIW | | 23 |
| SDR | Pass | TEMP 1 | | | 24 |
| WA-Y | Subtract | WA | | | 25 |
| SDR | Pass | Y | | * | 26 |
| Set stack exception because stack will wrap. | | | | | 27 |
| WA-Y | Subtract | — | | | 28 |
| WA | Pass | SAR | | ** | 29 |
| Set stack exception because of overflow. | | | | | 30 |
| TEMP 1 | Pass | SDR | SW | | 31 |
| WA | Pass | TEMP 1 | | | 32 |
| WA | +2 | Y | | | 33 |
| TEMP 2 | Pass | WA | | | 34 |
| WA + Y Stack | Add | SAR & WA | | | 35 |
| Using R7 | Pass | SDR | SW | | 36 |
| WA Stack | +2 | SAR & WA | | | 37 |
| Using (K) | Pass | SDR | SW | | 38 |
| | | | | *** | 39 |
| Y | Pass | Stack Using (K) | | | 40 |
| TEMP 1 | Pass | SDR | | | 41 |
| TEMP | Pass | SAR | SW | | 42 |
| IAR | Pass | WA | | | 43 |
| WA | +2 | SAR & IAR | LIW | | 44 |
| Next instruction processing | | | | | 45 |

*Branch on $\overline{\text{Carry}}$ to 28.
**Branch on Carry to 31.
***Branch on CTR $\phi$ to 37.

Store Multiple (STM) Summary

Cycles 1-7 are used to establish the Stack Control Block address (add contents of register specified by RB field in instruction to 16 bit absolute address in second word of instruction in this example). The old TEA is placed in Y in cycle 8. The number of registers and the size of the dynamic work area (N bytes) is fetched in cycle 9, and placed in Y register in cycle 13. Cycles 14-22 are used to compute the number of registers to be moved and the N bytes into the appropriate working registers. Cycles 23-25 compute the new TEA. (Old TEA minus element size.) The result is tested in cycle 26 to check whether the stack will wrap main storage. If so, an exception is indicated.

In cycle 29 the new TEA is compared against the LLA and a check made to see if an underflow occurs. If so, an exception is indicated. In cycle 31, the R number and N are stored. R7 is stored in cycle 36, and the remaining registers stored in a loop formed by cycles 37-39. The new TEA is stored into the Stack Control Block in cycle 42. The remaining cycles are used to prepare for the next instruction fetch.

Detailed Discussion of Store Multiple (STM) Operation

Microcycles 1-7 are used to establish the address of the Stack Control block 8a, FIG. 3, in main storage 8. This is done in this example by adding the contents of the register specified by the RB field in the STM instruction to a 16 bit absolute address in the second word of that instruction. In particular, in microcycles 1-7 microcycle 4 is used to fetch the selected register from the register stack 80 for the current level, using the RB field from the Op register 101, FIG. 2F. The data path 101A in FIG. 2F is entitled "Register Selection From Instruction." The value in the selected register is passed without modification through the ALU 51, FIG. 2E, and placed in the Y register 53. In microcycles 1-3 the 16 bit absolute address is fetched and in microcycle 5 the results from main storage 8, FIG. 1, which have arrived in the Processor Storage Data register 70 (SDR), FIG. 2E, are moved to the WA register 52. In microcycle 6, WA is added to Y to form the sum of these two previous operands, which amounts to the effective address, block 305, FIG. 3. This is placed in microcycle 6 in the Storage Address register 95, FIG. 2G, as well as in the work area. In the same microcycle a "Load Word" storage control is emitted to cause the operand at the base address of the Stack Control block 8a (Old TEA) to be fetched. The result of this storage control is evident in microcycle 8, where the resultant operand (Old TEA) is moved from the Storage Data register 70 into the Y register 53, FIG. 2E.

The LIW storage access in microcycle 9 is used to fetch the number of registers to be stored and the size of the dynamic work area (N bytes). This is placed in the Storage Data register 70 by the hardware control and is moved to Y register 53 in microcycle 13. The result is shifted in microcycle 14, masked with three binary 1 bits in microcycle 17, AND'd in microcycle 18, and further shifted in microcycle 19. Microcycles 20-22 are then used to align the register number (Rx) at the rightmost end of the WA register 52 and to align the number of bytes in the dynamic work area (N) into the Y register 53 for subsequent use by the ALU and the rest of the system controls.

Microcycles 23, 24 and 25 are used to compute the new Top Element Address (TEA), which is arrived at by subtracting the element size from the old top element address (remembering that the stack 8b, FIG. 3, is a push down stack). It is now necessary in microcycle 26 for hardware to check whether adding this new element to the stack will cause a wrap-around on main storage addressing. That is, the main storage address value moves through 0, through 65,536, and downwards to a smaller number. This is an illegal condition. If this happens, the Carry indicator is set by the hardware associated with the ALU results and the branch will not occur. Therefore, microcycle 27 is executed and a stack exception program check interruption will ensue. If the outcome of adding the new element to the stack does not cause main storage to wrap, the Carry indicator will not be set as a result of the arithmetic operation in microcycle 25, and from microcycle 26 a branch to microcycle 28 will occur. In microcycle 26 the Lower Limit Address (LLA) which was fetched from main storage in microcycle 23, is available in the Storage Data register 70, FIG. 2E, and is passed to Y register 53. In microcycle 28 the Y register (Lower Limit Address) is subtracted from the new Top Element Address and a check is made to see if an overflow occurs. This is a further facet of the hardware checking of stack manipulation for subroutine linkage. If an overflow occurs the Carry indicator will be set, the branch in microcycle 29 is not taken, and microcycle 30 is executed, causing a stack exception and the associated program check interruption. If a carry does not occur, microcycle 30 is not executed and execution will resume in microcycle 31, in which the register number and the number of bytes in the dynamic work area are stored. Register 7 is stored in microcycle 36 and the remaining registers are stored in main storage in stack 8b in a loop formed by microcycles 37, 38 and 39. The control of this loop is based on the count status of counter register 75, FIG. 2F, which is decremented on each pass through the loop and which was set up with the proper register number in microcycle 18. In microcycle 42, the new Top Element Address (TEA) is stored into the Stack Control block 8a, replacing the old Top Element Address. The address of the Stack Control block 8a for this purpose is retrieved from the register stack 80 location referred to as TEMP and passed into the Storage Address register 95. The computed new Top Element Address is retrieved in microcycle 41 from the register stack location TEMP 1 and moved into the Storage Data register 70. Microcycles 43 and 44 are used to update the Instruction Address Register 107 and place it in the Storage Address register 95 where, at microcycle 44, it is used to fetch the next instruction.

Table B shows the sequence of control signals which occur when a Load Multiple and Branch (LMB) instruction occurs. A Load Multiple and Branch instruction is used to extract an element from the stack.

TABLE B

| LMB MICROCODE | | Address Mode = (RB) + A RB ≠ O Instruction Address in WA Instruction in SDR and OP | | | |
|---|---|---|---|---|---|
| Source | ALU Control | Destination | Storage Control | Other | Step |
| WA | +2 | IAR | | | 1 |
| IAR | Pass | SAR & WA | LIW | | 2 |
| WA | +2 | IAR | | | 3 |
| Stack Using RB Field (Op Reg) | Pass | Y | | | 4 |
| SDR | Pass | WA | | | 5 |
| WA + Y | Add | SAR & WA | LW | | 6 |
| SDR | Pass | Y | | | 7 |
| WA | +2 | SAR | LW | | 8 |
| Y | Pass | WA | | | 9 |
| SDR | Pass | Y | | | 10 |
| WA − Y | Subtract | — | | * | 11 |
| Set stack exception because stack is empty | | | | | 12 |
| 17a WA | Pass | SAR | LW | | 12a |
| WA | +2 | TEMP 1 | | | 13 |
| Emit 0003 | Pass | Counter | | | 14 |
| SDR | Pass | Y | | | 15 |
| Shift WA & Y left until counter is zero. Decrement counter. | | | | | 16 |
| WA | +1 | WA | | | 17 |
| y | Pass | TEMP 2 | | | 18 |
| Emit 0007 | Pass | Y | | | 19 |

TABLE B-continued

LMB MICROCODE

Address Mode = (RB) + A
RB ≠ O
Instruction Address in WA
Instruction in SDR and OP

| Source | ALU Control | Destination | Storage Control | Other | Step |
|---|---|---|---|---|---|
| WA.Y | AND | Counter & WA | | | 20 |
| TEMP 2 | Pass | WA | | | 21 |
| TEMP 1 | Pass | Y | | | 22 |
| WA + Y | Add | SAR & WA | LW | | 23 |
| SDR | Pass | Stack (R7) | | ** | 24 |
| WA | +2 | SAR & WA | LW | | 26 |
| SDR | Pass | STACK using (K) | | *** | 27 |
| WA | +2 | SDR | | | 28 |
| TEMP | Pass | SAR | SW | | 29 |
| Stack (R7) | Pass | SAR & NA | LIW | | 30 |
| WA | Pass | IAR | | | 31 |

Next Instruction Processing.
*Branch on Carry to 12a.
**Branch CTR0 to 28
*** Branch to 25

LOAD MULTIPLE AND BRANCH (LMB) SUMMARY

Cycles 1-7 are used to calculate the effective address of the Stack Control block (in this example, add contents of register specified by RB field in instruction to 16 bit abslute address in second word of instruction). The old TEA is placed in Y in cycle 7, and in cycle 8, the fetch of the HLA occurs. The HLA is placed into Y in cycle 10. Cycle 11 tests for an empty stack condition.

Cycles 13-22 are used to get N (in bytes) to WA and the number of registers to be loaded into counter 75. Cycles 23 and 24 move R7 from main storage, while cycles 25-17 move the remaining registers.

Cycles 28 and 29 store the new TEA in the Stack Control Clock. Cycles 30 and 31 cause the branch address to be used to fetch the next instruction.

Detailed Discussion of Load Multiple and Branch (LMB) Operation

Microcycles 1-7 of this microcode, shown in Table B, are used for the same purpose as the first seven microcycles shown in Table A; to wit, to calculate the effective address of the Stack Control block 8a. The old Top Element Address is placed in Y register 53 in microcycle 7. In microcyle 8 the next sequential location in main storage is accessed (by adding 2 to the previous address), and the fetch of the High Limit Address (HLA) occurs. The old Top Element Address is moved from Y register 53 to the work area in cycle 9 to make room for the High Limit Address (HLA) to be placed into Y register 53 in cycle 10. In microcycle 11 the High Limit Address is subtracted from the Top Element Address to check for an empty stack condition. This is indicated by the Carry indicator being turned on in microcycle 11. If the Carry indicator is on, the branch in microcycle 11 does not occur and a stack exception is initiated with the appropriate program check interruption condition. If the stack limits are not violated, the branch in microcycle 11 occurs and execution resumes at microcycle 13. Microcycles 13-22 are used to separate the number of registers (Rx) to be loaded and the size in bytes (N) of the dynamic work area into two working registers. N is placed in the work area, and the number of registers to be loaded is placed into the counter 75. (Note the similarity to the reverse procedure used in the Store Multiple operation.) Cycles 23 and 24 are used to fetch register R7 from main storage 8 and place it into the appropriate location in the register stack 80. Microcycles 25, 26 and 27 form a loop to fetch the remaining registers from main storage 8 and place them in the appropriate positions in the register stack. It should be noted that the Stack Address register 105, FIG. 2G (called K in the microcode listing) increments by 1 in value each time it is used; thus no separate control to increment this register is required. The loop control is based upon the value in the counter, which is decremented each time it is tested in microcycle 25. When all registers have been moved a branch occurs from microcycle 25 to microcycle 28, which sets up the data (the net TEA) into Storage Data register 70. The address of the new TEA is retrieved from the location referred to as TEMP in the register stack and moved to the Storage Address register 95 where, in microcycle 29, it is stored into main storage 8 in the Stack Control block 8a. Cycles 30 and 31 take register R7 from the register stack (this register contains the address to be used for the next instruction fetch) and move it to the Storage Address register 105 and the work area. The Load Instruction Word (LIW) storage control in this microcycle is used to fetch the next instruction. In microcycle 31 this value is also placed in the CIAR 107, FIG. 2G, to permit future use. Subsequent microcycles are involved with the processing of the next instruction.

Thus, in the manner described, a highly efficient subroutine linkage procedure is performed.

While the invention has been particularly shown and described in connection with a preferred embodiment thereof, it will be evident to those skilled in the art that various changes in form and detail may be made without departing from the spirit and scope of the invention.

What is claimed is:

1. A subroutine linkage feature for a data processing system enabling the preservation of register contents of a requesting program and allocation of a dynamic work area for data generated during the subroutine operation, comprising:

main storage means having sequentially addressable storage locations for storing information representing control signals and data signals;

level storage means, said level storage means comprising a plurality of groups of prioritized level registers for storing and providing signals representative of significant information relative to program execution such as instruction addresses, level status indications and other information pertaining to the programs to be executed;

level control means interconnected with said level storage means and responsive to sequencing control signals during operation of said system to operate said level storage means to select said level register groups for transfer of information to and from said level registers in accordance with a predetermined priority arrangement;

an instruction source, said source providing signals representative of operations to be performed in said system as well as information to be utilized;

sequencing means responsive to signals from said instruction source including signals representative of a subroutine operation for providing control signals in timed sequence and including means for generating subroutine call signals from calling programs during operation of individual programs determined by said level control means in said system together with related Register to Storage instruction signals, said Register to Storage instruction signals including signals representative of (1) a Register to Storage Operation, (2) the starting address of a block of selected storage locations in said main memory, (3) at least one register in said level storage means, said at least one register including an instruction address indicative of the calling program, and (4) a number of storage location in said main memory comprising a dynamic work area to be accessed during a subroutine operation;

microcode storage means having individual microcode storage locations for storing microcode signal sequences including a first signal sequence for activating said system according to a predetermined Register to Storage sequence to (1) transfer the contents of the selected at least one register from the level register group in current use to the selected block of said main storage and to (2) reserve the dynamic work area in the selected block specified by said Register to Storage instruction signals;

microcode address means responsive to a single Register to Storage instruction signal set from said sequencing means to access in sequential order the microcode Register to Storage signal sequence in said microcode storage means; and decode means interconnected with said main storage means, said level control means, and said sequencing means and responsive to a microcode Register to Storage signal sequence as it is accessed to generate control signals to activate said main storage means, and said level control means in accordance with said predetermined Register to Storage signal sequence.

2. The system of claim 1 further comprising:

Storage to Register means in said sequencing means further operable to generate subroutine completion signals upon completion of a subroutine call together with related Storage to Register signals, said Storage to Register signals including signals representative of (1) a Storage to Register operation, and (2) the starting address of the block of storage locations in said main memory indicated by a preceding set of Register to Store signals;

a second signal sequence in said microcode storage means for activating said system according to a predetermined Storage to Register sequence to (1) re-transfer said selected at least one register from said main storage means to its assigned level register group, to (2) release the block of storage locations in said main storage means for other use, and (3) to return to the calling program via the instruction address contained in said at least one register;

said microcode address means further incorporating means responsive to a single Storage to Register signal set from said sequencing means to access in sequential order the microcode Storage to Register signal sequence in said microcode storage means; and said decode means incorporating means further responsive to said microcode Storage to Register signal sequence as it is accessed to generate control signals to activate said main storage means and said level control means in accordance with said predetermined Storage to Register signal sequence.

3. The system of claim 1 wherein:

said main storage means is designated a "push-down" stack and consists of individual blocks of information each defined by a Top Element Address, and having upper and lower storage location limits defined by a High Limit Address and a Low Limit Address, respectively, and said main storage means further including a Stack Control Block consisting of a group of storage locations sufficient in number to contain said Top Element Address, said High Limit Address and said Low Limit Address, and wherein said Store Multiple instruction signal set includes informatin representative of an effective address for accessing said stack Control Block to develop signals represenative of said individual blocks of information, and further comprising additional microcode signal sequences within said Store Multiple Signal sequence stored in said microcode storage means representative of signals required to develop said effective address; and wherein said decode means is responsive to said additional microcode signal sequence to provide control signals to said main storage address means and said arithmetic means to access said blocks of information during subroutine operations.

4. The system of claim 3 wherein said Store Multiple instruction signals specify in said main memory (a) a Stack Control Block Address (A), (b) a Limit Register No. (Rx), (c) a number (N) to allocate bytes in said main memory as a dynamic work area, wherein said Store Multiple microcode signal sequence includes signals representative of accessing said stack under control of said Stack Control Block Address (A); decrementing the Top Element Address (TEA) based on the allocate value (N); assigning registers R0 through Rx and a Link register R7 in said main storage means; storing the base address of the dynamic work area in register Rx; storing Rx and N in said stack; and storing a calling routine return address in said register R7; and further comprising:

means in said decode means responsive to said Store Multiple signal sequences from said microcode storage means for devloping and supplying control signals to activate said main storage address means, said main storage data register, said arithmetic means, and said level control means to initiate and complete said Store Multiple operation in the sequence determined by said microcode signal representations.

5. The system of claim 4 wherein said Load Multiple and Branch instruction signals specify the TEA for reaccessing said subroutine stack, wherein said Load Multiple and Branch microcode signal sequence includes signal representations for retrieving values Rx and N from said stack for controlling the re-transfer of register information, such as status information, and restoring stack control accessing to its former status; returning to the calling routine under control of the return address in register R7, and further comprising:
- means in said decode means responsive to said Load Multiple and Branch signal sequence for said microcode storage means for developing and supplying control signals to activate said main storage address means, said main storage data register means, said arithmetic means, and said level control means to initiate and complete said Load Multiple and Branch operation in the sequence determined by said microcode signal representations.

6. A subroutine linkage feature for a data processing system enabling the preservation of register contents of a requesting program and allocation of a dynamic work area for data generated during the subroutine operation, comprising:
- main storage means having sequentially addressable storage locations for storing information representing control signals and data signals;
- main storage address means interconnected with said storage means and operable in response to storage address signals for selectively accessing locations in said storage means;
- main storage data register means interconnected with said storage means and selectively operable in response to information signals to transfer information to or from said storage means;
- arithmetic means responsive to signals representative of operands and further operable in response to arithmetic control registers to perform arithmetic operations on said operands;
- level storage means, said level storage means comprising a plurality of groups of prioritized level registers for storing and providing signals representative of significant information relative to program execution such as instruction addresses, level status indications and other information pertaining to the programs to be executed;
- level gating means interconnected with said level storage means and responsive to level control signals for gating information into and out of said level storage registers;
- level control means interconnected with said level storage means and responsive to sequencing control signals during operation of said system to operate said level gating means to select said level register groups in accordance with a predetermined priority arrangement;
- an instruction source, said source providing signals representative of operations to be performed in said system as well as information to be utilized;
- sequencing means responsive to signals from said instruction source including signals representative of a subroutine operation for providing control signals in timed sequence including means for generating subroutine call signals from calling programs during operation of individual programs determined by said level control means in said system together with related Store Multiple instruction signals including signals representative of (1) a Store Multiple Operation, (2) the starting address of a block of selected storage locations in said main storage means, (3) at least one register in said level storage means, said at least one register including an instruction address indicative of the calling program, and (4) a number of storage locations in said main storage means comprising a dynamic work area to be accessed during a subroutine operation;
- microcode storage means having individual microcode storage locations for storing microcode signal sequences including a first signal sequence for activating said system in accordance with a predetermined Store Multiple (STM) sequence to (1) transfer the contents of the selected at least one register from the level register group in current use to the selected block of said main storage through said storage data register and to (2) reserve the dynamic work area in the selected block specified by said Store Multiple instruction signals;
- microcode address means responsive to a single Store Multiple instruction signal set from said sequencing means to access in sequential order the microcode Store Multiple signal sequence in said microcode storage means; and
- decode means interconnected with said main storage address means, said main storage data register means, said arithmetic means, said level control means and said sequencing means and responsive to microcode Store Multiple signal sequences as they are accessed to generate control signals to activate said main storage address means, said main storage data register means, said arithmetic means, and said level control means in accordance with said predetermined Store Multiple signal sequence.

7. The system of claim 6, further comprising:
- Load Multiple and Branch means in said sequencing means operable to generate subroutine completion signals upon completion of a subroutine call together with related Load Multiple and Branch signals, said Load Multiple and Branch signals including signals representative of (1) a Load Multiple and Branch operation, and (2) the starting address of the block of storage locations in said main storage means indicated by a preceding set of Store Multiple signals;
- a second signal sequence in said microcode storage means for activating said system according to a predetermined Load Multiple and Branch (LMB) sequence to (1) retransfer said selected at least one register from said main storage means to its assigned level register group, to (2) release the block of storage locations in said main storage means for other use, and (3) to return to the calling program via the instruction address contained in said at least one register;
- means in said microcode address means further responsive to a single Load Multiple and Branch instruction signal set from said sequencing means to access in sequential order the microcode Load Multiple and Branch signal sequence in said microcode storage means; and
- means in said decode means further responsive to said microcode Load Multiple and Branch signal sequence to generate control signals to activate said main storage address means, said main storage data register means, said arithmetic means, and said level control means in accordance with said predetermined Load Multiple and Branch (LMB) signal sequence.

* * * * *